US 11,458,626 B2

(12) United States Patent
Kimura

(10) Patent No.: US 11,458,626 B2
(45) Date of Patent: Oct. 4, 2022

(54) TRAJECTORY GENERATING METHOD, AND TRAJECTORY GENERATING APPARATUS

(71) Applicant: CANON KABUSHIKI KAISHA, Tokyo (JP)

(72) Inventor: Gen Kimura, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 16/257,748

(22) Filed: Jan. 25, 2019

(65) Prior Publication Data
US 2019/0240833 A1 Aug. 8, 2019

(30) Foreign Application Priority Data

Feb. 5, 2018 (JP) .............................. JP2018-018583
Sep. 21, 2018 (JP) .............................. JP2018-178064

(51) Int. Cl.
*B25J 9/16* (2006.01)
*B25J 9/00* (2006.01)

(52) U.S. Cl.
CPC ............ *B25J 9/1664* (2013.01); *B25J 9/0081* (2013.01); *B25J 9/1651* (2013.01)

(58) Field of Classification Search
CPC ...... B25J 9/1651; B25J 9/0081; B25J 9/1664; B25J 9/1666; B25J 9/1694; B25J 9/1676; B25J 9/1692; B25J 9/1674; B25J 9/1671
See application file for complete search history.

(56) References Cited

U.S. PATENT DOCUMENTS 7,447,593 B2 * 11/2008 Estkowski ........... G05D 1/0212
701/301
8,700,307 B1 * 4/2014 Zhao ...................... B25J 9/1666
701/301
(Continued)

FOREIGN PATENT DOCUMENTS

CN 101770235 A 7/2010
CN 103425053 A 12/2013
(Continued)

OTHER PUBLICATIONS

M. Kalakrishnan, et al., "STOMP: Stochastic Trajectory Optimization for Motion Planning", Robotics and Automation (ICRA) 2011 IEEE International Conference.
(Continued)

*Primary Examiner* — Jeff A Burke
*Assistant Examiner* — Arslan Azhar
(74) *Attorney, Agent, or Firm* — Venable LLP

(57) ABSTRACT

A trajectory generating method includes a first generating process of generating a plurality of trajectories between a start teaching point and a target teaching point, an evaluation process of evaluating a motion of the robot arm on each trajectory to calculate an evaluation value of each trajectory, a selection process of selecting one of the plurality of trajectories based on calculated evaluation values, and an update process of updating the trajectory by repeating the processes of generating a plurality of new trajectories by changing a selected trajectory in the selection process, of calculating an evaluation value of a motion of the robot arm on each changed trajectory and of selecting a trajectory based on calculated evaluation values.

31 Claims, 17 Drawing Sheets

(56) References Cited

U.S. PATENT DOCUMENTS

| | | | | |
|---|---|---|---|---|
| 2004/0133309 | A1* | 7/2004 | Huttenhofer | B25J 9/1664 700/245 |
| 2004/0199848 | A1* | 10/2004 | Tamesue | H03M 13/2975 714/758 |
| 2007/0030271 | A1* | 2/2007 | Kamiya | B25J 9/1664 345/442 |
| 2009/0037021 | A1* | 2/2009 | Sladek | B25J 9/1664 700/245 |
| 2011/0106307 | A1* | 5/2011 | Kim | G05D 1/0214 700/246 |
| 2014/0121833 | A1* | 5/2014 | Lee | B25J 9/1666 700/255 |
| 2014/0297030 | A1* | 10/2014 | Iwasaki | B25J 9/1664 700/245 |
| 2015/0100194 | A1* | 4/2015 | Terada | G05D 1/0214 701/25 |
| 2016/0016311 | A1* | 1/2016 | Konolige | B25J 9/1612 700/245 |
| 2016/0039090 | A1* | 2/2016 | Oyamada | B25J 9/163 700/253 |
| 2017/0165845 | A1* | 6/2017 | Kurimoto | B25J 19/063 |
| 2017/0348856 | A1* | 12/2017 | Nakaya | B25J 9/1664 |
| 2017/0364076 | A1* | 12/2017 | Keshmiri | G05B 19/0426 |
| 2018/0036882 | A1 | 2/2018 | Kimura | |
| 2018/0178383 | A1* | 6/2018 | Burkhart | B25J 9/1669 |
| 2019/0176325 | A1* | 6/2019 | Liu | B25J 9/1664 |

FOREIGN PATENT DOCUMENTS

| | | |
|---|---|---|
| CN | 107571261 A | 1/2018 |
| JP | H04-201081 A | 7/1992 |
| JP | H10-260714 A | 9/1998 |
| JP | 11-347984 | 12/1999 |
| JP | 2001-273022 A | 10/2001 |
| JP | 2005-309990 A | 11/2005 |
| JP | 2008-269021 A | 11/2008 |
| JP | 2015-160277 A | 9/2015 |
| JP | 2015-208811 A | 11/2015 |
| JP | 2016-036895 A | 3/2016 |
| JP | 2017-152051 A | 8/2017 |
| JP | 2018-144223 A | 9/2018 |
| WO | 2016-206798 A2 | 12/2016 |

OTHER PUBLICATIONS

G. Sanchez, et al., "On Delaying Collision Checking in PRM Planning: Application to Multi-Robot Coordination", International Journal of Robotics Research, vol. 21, No. 1, pp. 5-26, 2002.

Japanese Office Action dated Oct. 19, 2021 during prosecution of related Japanese application No. 2018-018583 (English-language machine translation included.).

Chinese Office Action dated May 7, 2022 during prosecution of related Chinese application No. 201910101556.2 (English-language machine translation included.).

Japanese Office Action dated Jul. 26, 2022 during prosecution of related Japanese application No. 2018-178064 (English-language machine translation included.).

* cited by examiner

S100

S101

S102~S106

S107

S108

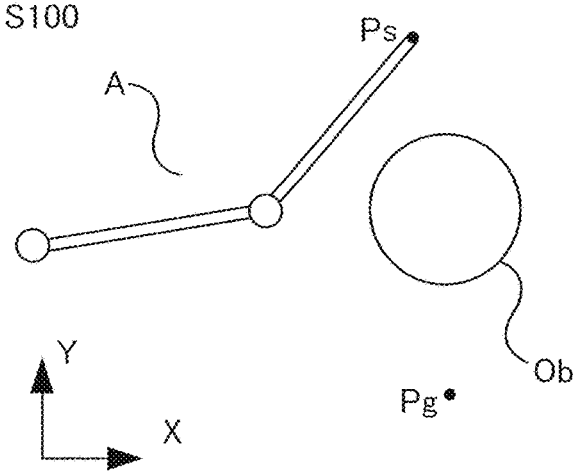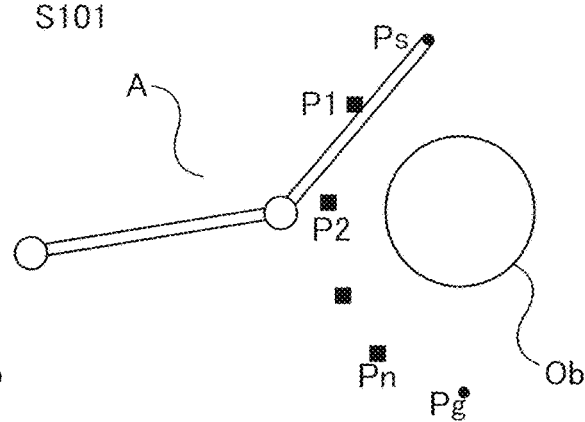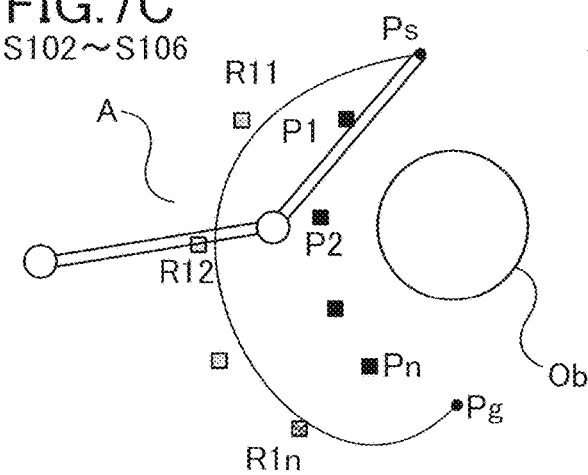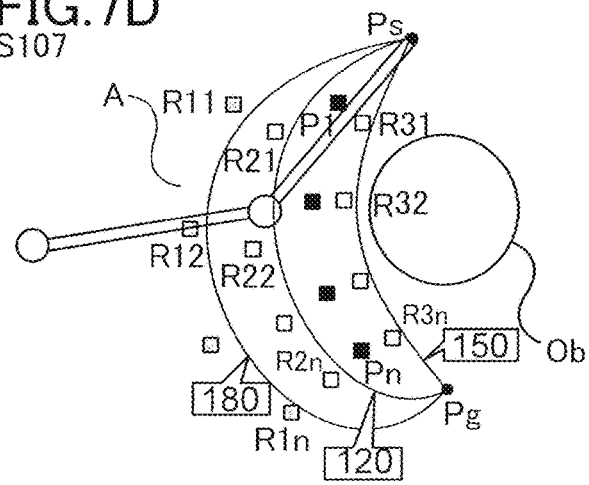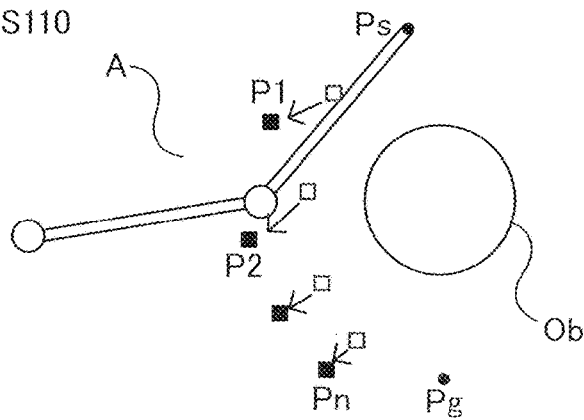

FIG.11
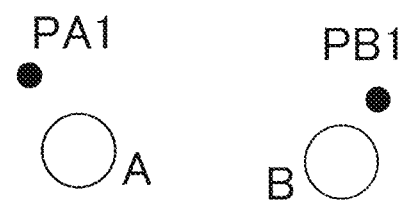
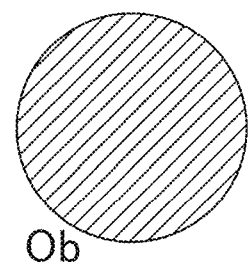
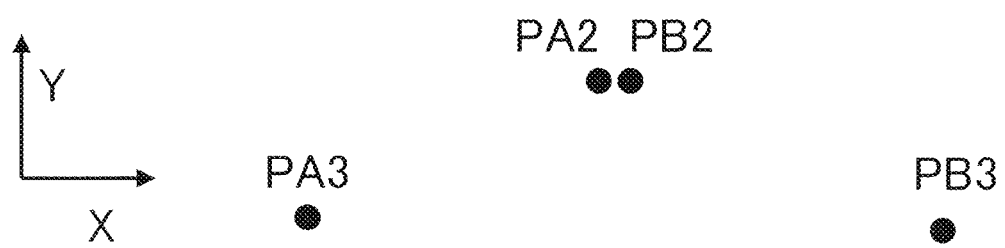

S100

S101~S102

S103~S108

S109

TRAJECTORY GENERATING METHOD, AND TRAJECTORY GENERATING APPARATUS

BACKGROUND OF THE INVENTION

Field of the Invention

The present invention relates to a trajectory generating method for generating a trajectory of a robot arm, and a trajectory generating apparatus.

Description of the Related Art

Hitherto, there has been known a configuration in which an industrial robot system is disposed in a manufacturing system (line) of an article (industrial product) such as an automobile and an electric product to automate such works as welding and assembling. In the manufacturing system of this sort, the robotic system, works, a work placing table, a tool and other peripheral devices are disposed in a condition in which they may interfere (contact, collide) with each other. Then, lately, a simulation using a virtual environment is often utilized in designing an operational trajectory of an arm of the robotic system in such manufacturing system.

In a case where a simulator system is used in off-line so as to simulate a motion of the robotic system, 3-D (three-dimensional) models of the robot arm, the works, the work placing table, the tool and other peripheral devices are placed within the virtual environment. For instance, some simulator system generates a trajectory between teaching points of a robot arm prepared in advance and operates the 3-D model of the robot arm along the trajectory within the virtual environment to verify the motion of the robot arm. A state how the model of the robot arm operates can be displayed in a motion picture format for example on a virtual display area in a display of the simulator system.

A simulation result ends up being considerably different naturally depending on the operational trajectory of the robot arm. If the trajectory of the robot arm is inappropriate, there arise such problems that a part of the operational trajectory of the robot arm enters an area where the robot arm is inoperable, the robot arm interferes with another object, or a cycle time is delayed by a useless motion.

According to a conventional method, an operator prepares teaching points of the robot arm satisfying such conditions that the robot arm does not enter the area where the robot arm becomes inoperable or does not interfere with the peripheral devices in a trial and error manner. In such a case, because such conditions that the robot arm is movable or does not interfere with other objects are taken into account at first, there is a case where a robot trajectory that always allows the robot arm to operate at optimum motion speed is not generated, thus delaying the cycle time. In such a case, manual works are required to reconsider and to reset the teaching points of the robot arm.

Meanwhile, in a case of using the robotic system in the manufacturing system (line), man-hours in preparing the teaching points of a process designer is large, so that a rise of personal costs has become a problem. Then, lately, instead of teaching directly by a teacher, there have proposed a method and an apparatus that make the works for teaching the robot arm efficient through a use of a computer.

Kalakrishnan, Mrinal, et al. "STOMP: Stochastic trajectory optimization for motion planning." Robotics and Automation (ICRA), 2011 IEEE International Conference on IEEE, 2011 (referred to a non-patent document 1 hereinafter) discloses a method for generating a trajectory that avoids a robot arm from interfering with surrounding obstacles and for minimizing torque of a motor used in a joint of the robot arm. FIG. 8 schematically illustrates the method for generating the trajectory of the robot arm in the non-patent document 1. FIG. 8 illustrates a robot arm A having two rotational shafts of J1 and J2 and simplified to two degrees of freedom and an obstacle Ob.

In FIG. 8, p1, p2 . . . p9 respectively indicate positions through which a hand of a robot arm A (TCP: Tool Center Point) is moved. Among these positions, p1 indicates a motion starting position (start teaching point), and p9 indicates a motion target position (target teaching point), respectively. Still further, p2 through p8 indicate intermediate command values disposed between the starting position (p1) and the target position (p9). For instance, it is possible to sequentially instruct the robot arm A to take orientations of p1, p2 . . . p9 per each control period so as to take a motion of starting from p1 and arriving at p9. In this case, an operation time of the robot arm between the starting position (p1) and the target position (p9) can be calculated as control period x (9−1). In the case of the non-patent document 1, a number of the intermediate command values (p2 through p8) is determined in advance as a constant and is 7 in this case. While the robot arm interferes with the obstacle Ob at p4 and p5 in FIG. 8, it is possible to generate a trajectory that enables the robot arm to avoid the interference by the following method.

At first, displacements are given smoothly to joint angles corresponding to the intermediate command values p2, p3 . . . p8 to generate new N intermediate command values ri2, ri3, . . . ri8 (i=1, N). Next, the intermediate command values ri2, ri3, . . . ri8 (i=1, . . . N) are evaluated and based on values of the evaluation, processes of displacing the intermediate command values p2, p3 . . . p8 are repeated to optimize the trajectory. The non-patent document 1 uses a sink-in amount of the robot arm A and the obstacle Ob and a torque of a motor used in each joint shaft as evaluation values of the intermediate command values. The trajectory by which the robot arm A does not interfere with the obstacle Ob and by which the torque of the motor used in each joint shaft is not overloaded is generated by using such evaluation values.

As described above, the technology of the non-patent document 1 enables to generate the trajectory by which the robot arm A does not interfere with the obstacle Ob and by which the torque of the motor used in each joint shaft is not overloaded. According to the technology disclosed in the non-patent document 1 however, a number of the intermediate command values is a fixed number. Accordingly, the operation time from the start teaching point (p1) to the target teaching point (p9) is fixed, so that there is a problem that an operation time of the arm cannot be optimized for example. Still further, it becomes difficult to satisfy a constraint condition of the motor torque used in each joint shaft and other constraint conditions if the operation time is fixed. The constraint conditions related to operations of the robot arm that become difficult to achieve are those of a joint shaft torque, a joint angular velocity, a joint angular acceleration, a jerk acceleration, hand velocity and hand acceleration for example. That is, the prior art as described in the non-patent document 1 has the following problems. That is, the constraint conditions related to the motion of the robot cannot be guaranteed to be satisfied in an area in which a number of intermediate command values is too small and a trajectory by which an operation time is optimized cannot be obtained in an area in which there are too many number of intermediate command values in contrary.

SUMMARY OF THE INVENTION

According to a first aspect of the present invention, a trajectory generating method for generating a trajectory on which a robot arm is operated between a start teaching point and a target teaching point, includes a first generating process of generating a plurality of trajectories between the start teaching point and the target teaching point, an evaluation process of evaluating a motion of the robot arm on each trajectory generated in the first generating process to calculate an evaluation value of each trajectory, a selection process of selecting one of the plurality of trajectories based on calculated evaluation values, and an update process of updating the trajectory by repeating the processes of generating a plurality of new trajectories by changing a selected trajectory in the selection process, of calculating an evaluation value of a motion of the robot arm on each changed trajectory and of selecting a trajectory based on calculated evaluation values.

According to a second aspect of the present invention, a trajectory generating apparatus for generating a trajectory on which a robot arm is operated between a start teaching point and a target teaching point, includes a controller executing a first generating process of generating a plurality of trajectories between the start teaching point and the target teaching point, an evaluation process of evaluating a motion of the robot arm on each trajectory generated in the first generating process to calculate an evaluation value, a selection process of selecting one of the plurality of trajectories based on calculated evaluation values, and an update process of updating a trajectory by repeating the processes of generating a plurality of new trajectories by changing a selected trajectory in the selection process, of calculating an evaluation value of a motion of the robot arm on each of the changed trajectories and of selecting a trajectory based on calculated evaluation values.

Further features of the present invention will become apparent from the following description of exemplary embodiments with reference to the attached drawings.

BRIEF DESCRIPTION OF THE DRAWINGS

FIG. 7A illustrates an initial step of a trajectory optimization process of a second embodiment of the present disclosure.

FIG. 7B illustrates a next step of the trajectory optimization process of the second embodiment of the present disclosure.

FIG. 7C illustrates a further step of the trajectory optimization process of the second embodiment of the present disclosure.

FIG. 7D illustrates a still further step the trajectory optimization process of the second embodiment of the present disclosure.

FIG. 7E illustrates a still next step of the trajectory optimization process of the second embodiment of the present disclosure.

FIG. 11 illustrates teaching point groups of a plurality of robot arms and an obstacle according to a third embodiment of the present disclosure.

DESCRIPTION OF THE EMBODIMENTS

Embodiments for carrying out the present disclosure will be described below with reference to the drawings. Note that the following configurations are exemplary configurations to the end, and a person skilled in the art may appropriately modify a detailed configuration for example within a scope not departing from a gist of the present disclosure. Numerical values adopted in the embodiments are also referential numerical values and do not limit the present disclosure.

First Embodiment

Figure 1:
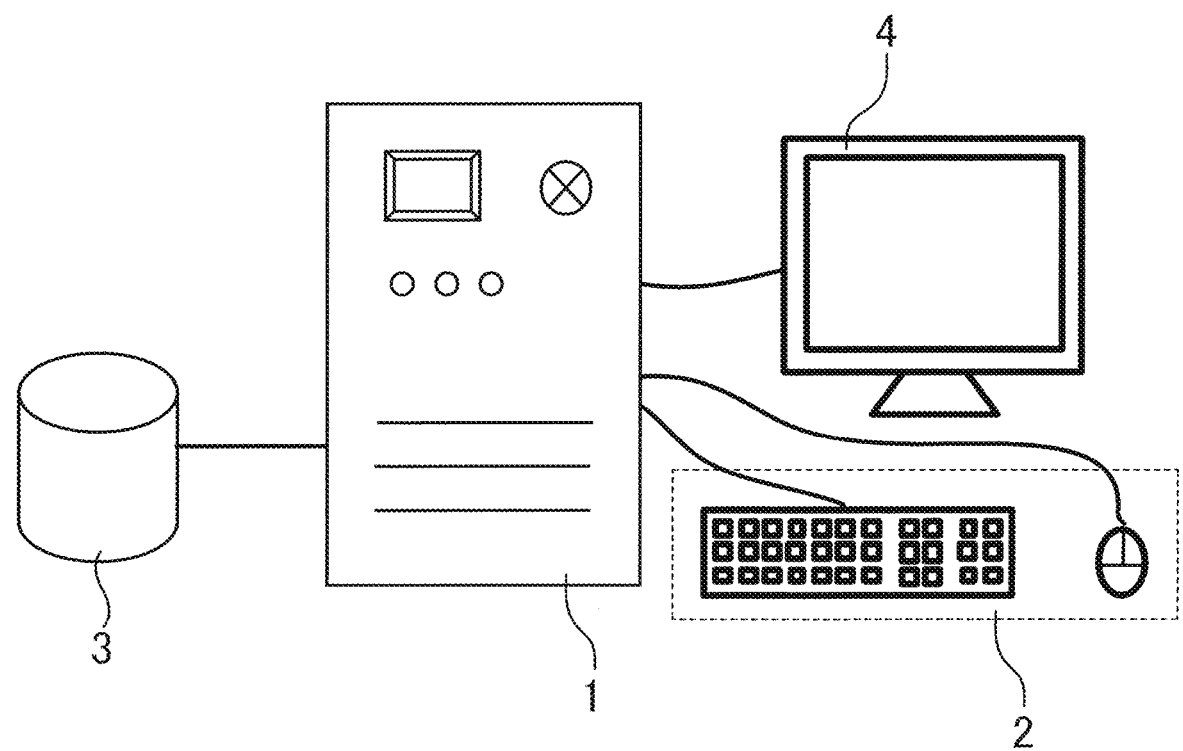
FIG. 1 illustrates a functional configuration of a trajectory generating apparatus of a first embodiment of the present disclosure.

FIG. 1 illustrates a configuration of a trajectory generating apparatus of a first embodiment. Note that while "the trajectory generating apparatus" refers to an apparatus for generating a trajectory of the present disclosure in the present embodiment, the apparatus may be what is provided as a robot simulator system for example.

Figure 9:
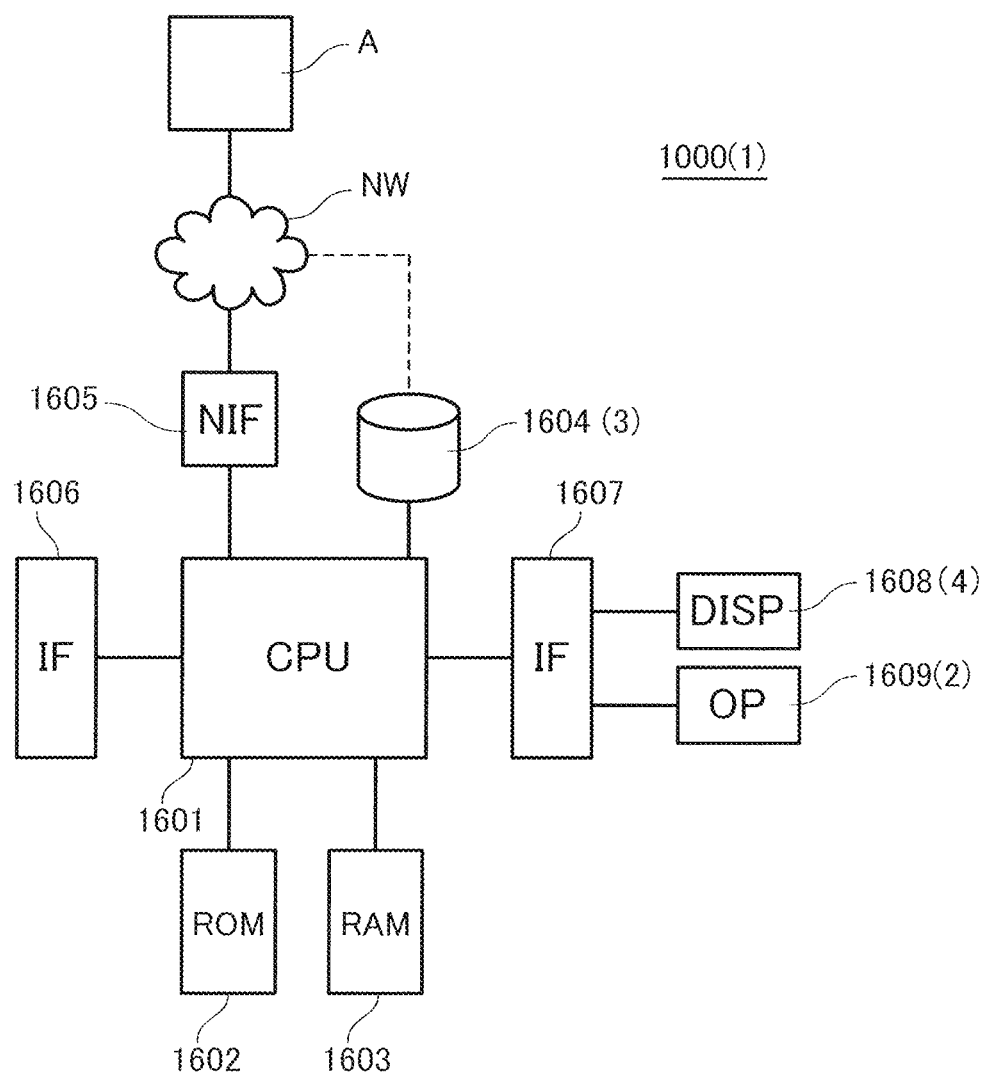
FIG. 9 is a block diagram illustrating a schematic configuration of a controller applicable to the embodiments of the present disclosure.

The trajectory generating apparatus as illustrated in FIG. 1 includes an arithmetic processor 1, an operating unit 2 enabling a teacher or the like to input data, a recording unit 3 for recording an operation program and others and a display unit 4 for displaying an operational trajectory and others of a robot arm. The trajectory generating apparatus can be configured by computer hardware such as a PC (Personal Computer). FIG. 9 illustrates a specific exemplary configuration of the arithmetic processor 1.

Figure 10:
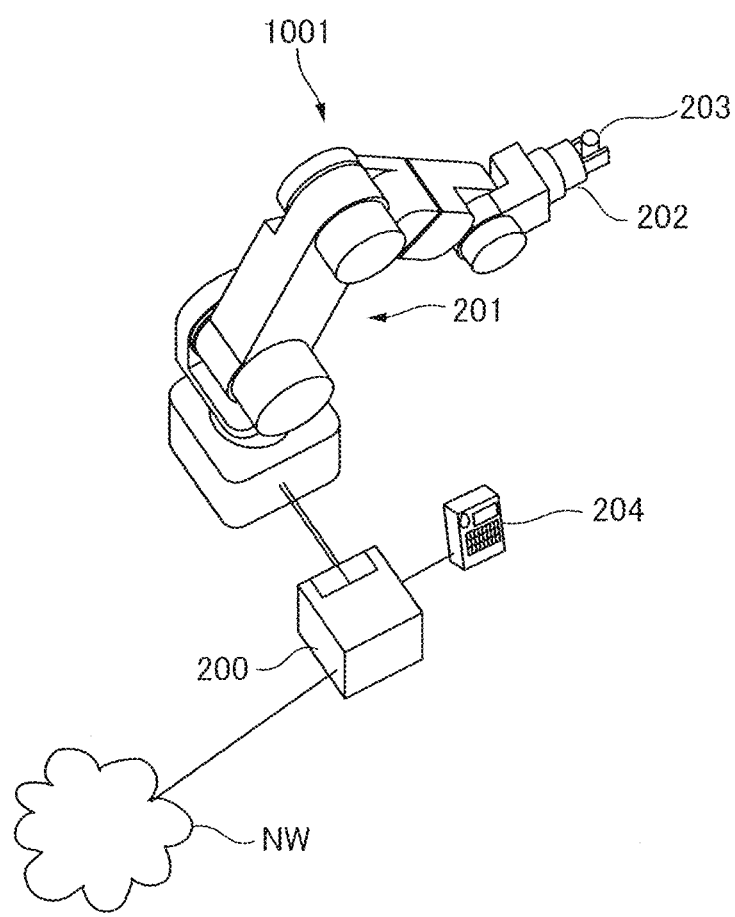
FIG. 10 illustrates a robotic system which can be disposed in a manufacturing system of the embodiments of the present disclosure.

FIG. 9 illustrates an exemplary configuration of a controller 1000 corresponding to a main part of the trajectory generating apparatus or the arithmetic processor 1 in particular (FIG. 1). As illustrated in FIG. 9, the controller 1000 is a control system including each block disposed around a CPU 1601. It is noted that this configuration including each block disposed around the CPU 1601 is applicable almost in the same manner to a robot controller (200: FIG. 10) described later for example.

The controller 1000 in FIG. 9 includes the CPU 1601 serving as a main controller, a ROM 1602 and a RAM 1603 serving as storage units. A control program and constant information of the CPU 1601 for realizing a control procedure described later can be stored in the ROM 1602. The RAM 1603 is used as a work area of the CPU 1601 in executing the control procedure described later.

In a case where FIG. 9 illustrates the configuration of the arithmetic processor 1 (FIG. 1), a display 1608 (the display unit 4 in FIG. 1) and an operation unit 1609 (the operation unit 2 in FIG. 2) are connected with an interface 1607 as a user interface system. The operation unit 1609 can be composed of a full-keyboard, a pointing device or the like and constitutes a user interface for an operator simulating and verifying a trajectory.

The controller 1000 illustrated in FIG. 9 includes a network interface 1605 serving as a communication unit for communicating through a network NW The arithmetic processor 1 in FIG. 1 can transmit/receive control information such as teaching point data and trajectory data to/from the robot arm A (or the robot controller 200 in FIG. 10) of an actual machine through the network interface 1605 and the network NW In such a case, the network interface 1605 is structured in conformity with a communication standard of a wired communication of IEEE 802.3 or of a radio communication of IEEEs 802.11 or 802.15 for example. However, an arbitrary communication standard other than those described above may be naturally adopted for the network NW.

A control program of the CPU 1601 for realizing a control procedure described later can be stored in the external storage unit 1604 composed of HDD and SSD and in a storage unit of the ROM 1602 (such as EEPROM area). In such a case, the control program of the CPU 1601 for realizing the control procedure described later can be supplied to the storage unit or can be updated to a new (other) program through the network interface 1605. Or, the control program of the CPU 1601 for realizing the control procedure described later can be supplied to the storage unit described above or can be updated to a new (other) program through a storage device such as various magnet disks, optical disks and flash memories and through their drive units. Accordingly, the various storage devices and storage units in a condition of storing the control program of the CPU 1601 for realizing the control procedure described above constitute a computer readable storage medium storing the control procedure of the present disclosure.

Note that in the case of the robot controller 200 (in FIG. 10), a driver circuit for driving a motor and a solenoid (not illustrated) of each part of the robot arm A is connected to the interface 1606 in the system of FIG. 9. Still further, the user interface including the display 1608 and the operation unit 1609 may be replaced with an operation terminal 204 in FIG. 10 for example such as a teaching pendant in the case of the robot controller 200.

A robot arm is composed of joints and links in general, and a joint mechanism includes various types such as a rotational joint, a linear motion joint and a ball joint. In the present embodiment, the robot arm for which a trajectory generated is presumed to have a configuration in which links are coupled by a rotational joint as illustrated in FIG. 2.

Figure 2:
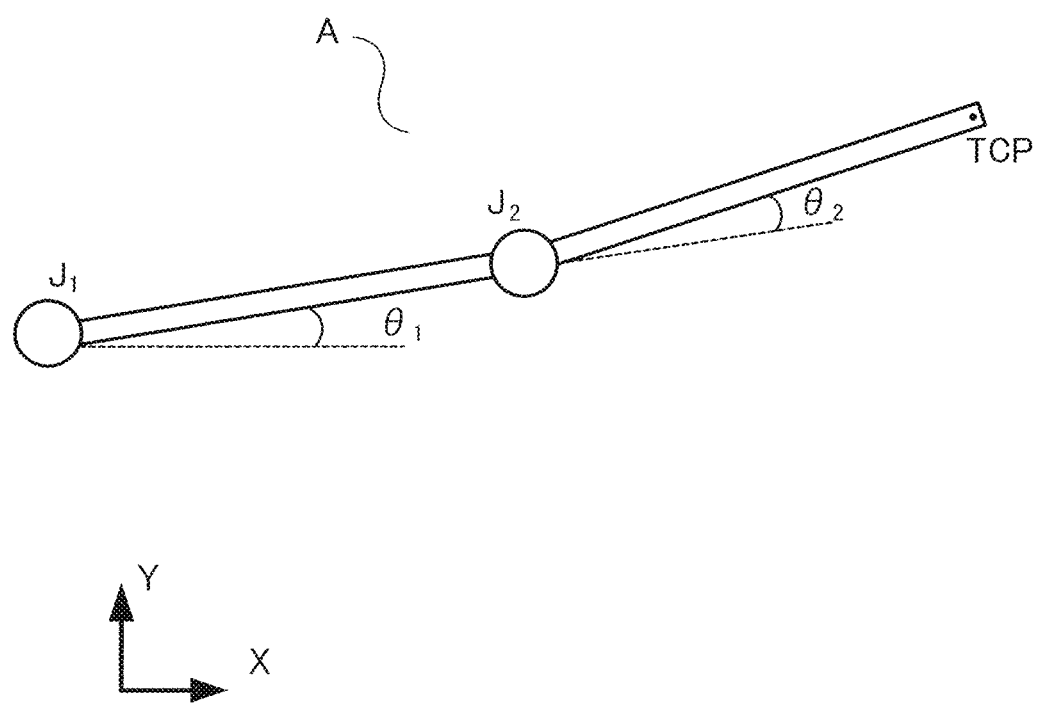
FIG. 2 illustrates a two-axial configuration of a robot arm of the first embodiment of the present disclosure.

FIG. 2 illustrates an exemplary robot arm for which the trajectory is to be generated in the present embodiment. The robot arm A in FIG. 2 is simplified to facilitate its description.

The robot arm A in FIG. 2 has two shafts J1 and J2 constituted of two rotational joints. Joint angles (joint positions) of the shafts J1 and J2 of these joints will be denoted respectively as $\theta 1$ and $\theta 2$ hereinafter. A tip of the shaft J2 will be defined as a TCP (Tool Center Point) serving as a reference position. In the present embodiment, a teaching point defining a position of the robot arm A will be expressed as a position of the TCP. The trajectory of the robot arm A to be generated is generated as a trajectory through which the TCP moves.

In general, in a case where the joint angles $\theta 1$ and $\theta 2$ of the shafts J1 and J2 are given, it is possible to acquire the position of the TCP by kinematic operations and in a case where the position of the TCP is given, it is possible to acquire the joint angles $\theta 1$ and $\theta 2$ of the shafts J1 and J2 by inverse-kinematic operations when the TCP takes that position. Note that in a case where the TCP is referred, there is a case where it is simply called as a 'hand' hereinafter.

Note also that while the robot arm A is illustrated to have a very simplified configuration in order to facilitate understanding, this configuration is not limited to the embodiments of the present disclosure. For instance, a person skilled in the art can use a configuration of a six-axes articulated robot arm or a linear motion type robot arm as the robot arm A in carrying out the present disclosure. Then, the configuration and the control procedure of the control system of the robot arm of the following embodiments can be readily expanded to the case of using such robot arms.

Next, a moving operation of the robot arm A will be described. In a case where the robot arm A is moved, a teaching point indicating a starting position of the move is referred to as a start teaching point and a teaching point indicating a target position is referred to as a target teaching point. It is possible to determine a position of the robot arm A by a position and orientation of the hand (TCP) or by joint shaft angles. Or, the position and orientation of the hand (TCP) can be convertible to a joint angle of each joint shaft by inverse-kinematic operations and inversely, the joint angle of each joint shaft is convertible to the position and orientation of the hand (TCP) by (normal) kinematic operations.

Here, the start teaching point and the target teaching point will be denoted respectively as Ps and Pg. Still further, teaching points disposed between the start and target teaching points will be called as intermediate teaching points and denoted as P1, P2 . . . Pn. In a case where the intermediate teaching points P1, P2 . . . Pn are generically named, there is a case where they are called as an intermediate teaching point group.

As a method for smoothly interpolating the intermediate teaching point group P1, P2 . . . Pn by a curve, there are such known interpolation methods as Spline interpolation, B-Spline interpolation and Bezier curve interpolation. It is possible to smoothly operate the robot arm A by generating a path smoothly linking those teaching points.

In the present specification, an "operational path" or the "path" of the robot arm refers to a locus of a motion of the robot arm not including time concept such as speed. Still further, an "operational trajectory" or the "trajectory" of the robot arm means an information body having information of motion speed of the robot arm in addition to the above-mentioned "(operational) path" of the robot arm and is clearly distinguished from the above-mentioned "(operational) path" in the present specification. It is noted that there is a case where the "trajectory" is expressed by a command value data string of the joint (angle) of the robot arm per certain unit time, e.g., per control clock period of the robot arm, in the robot control technology.

There is a minimum time control as a method for generating a trajectory including speed information to the path of the robot arm generated by using the above-mentioned interpolation method. It becomes possible to find a trajectory by which an operation time is minimized while keeping physical constraint conditions of the robot arm based on the path generated by the interpolation by using the minimum time control. Note that the minimum time control is a technology of finding a moving speed by which the operation time is minimized on a predetermined path, and the path through which the robot arm is operated depends on the intermediate teaching point group P1, P2 . . . Pn to the end. As the physical constraint conditions of the robot arm other than that described above, it is conceivable to operate a joint torque constraint, a joint angular speed constraint, a joint angular acceleration constraint, a jerk constraint, a hand speed constraint and a hand acceleration constraint for example. The trajectory generated through the use of minimum time control will be expressed as p1, p2, . . . pt as a string of position command values of robot arm per control period.

Figure 3:
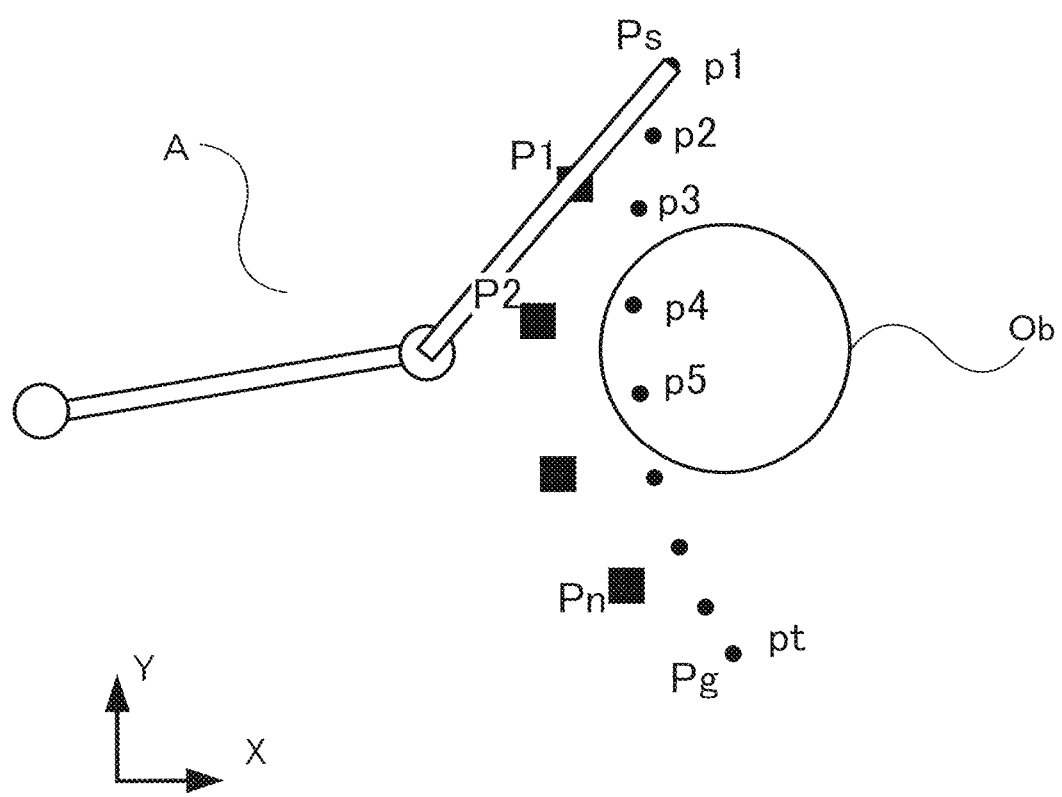
FIG. 3 illustrates a teaching point group and a trajectory of the first embodiment of the present disclosure.

FIG. 3 illustrates a state in which a 3-D model or a robot arm model simulating the robot arm A and the 3-D model or an obstacle model simulating an obstacle Ob are disposed both in an operation environment (virtual environment). FIG. 3 also illustrates the start teaching point Ps, the target teaching point Pg, the intermediate teaching point group P1, P2 . . . Pn and a trajectory (p1, p2, . . . pt) generated by the teaching points.

The robot arm A interferes with the obstacle Ob at p4 and p5 in the trajectory (p1, p2, . . . pt) illustrated in FIG. 3 and cannot move from the start teaching point Ps to the target teaching point Pg with this trajectory. The present embodiment aims at finding an optimum intermediate teaching point group P1, P2 . . . Pn by which the robot arm does not interfere with the obstacle in the path from the start teaching point Ps to the target teaching point Pg (and which satisfy other conditions). Note that it is possible to calculate the optimum trajectory not only in a case where the obstacle Ob stands still but also in a case where the obstacle Ob moves.

Figure 4:
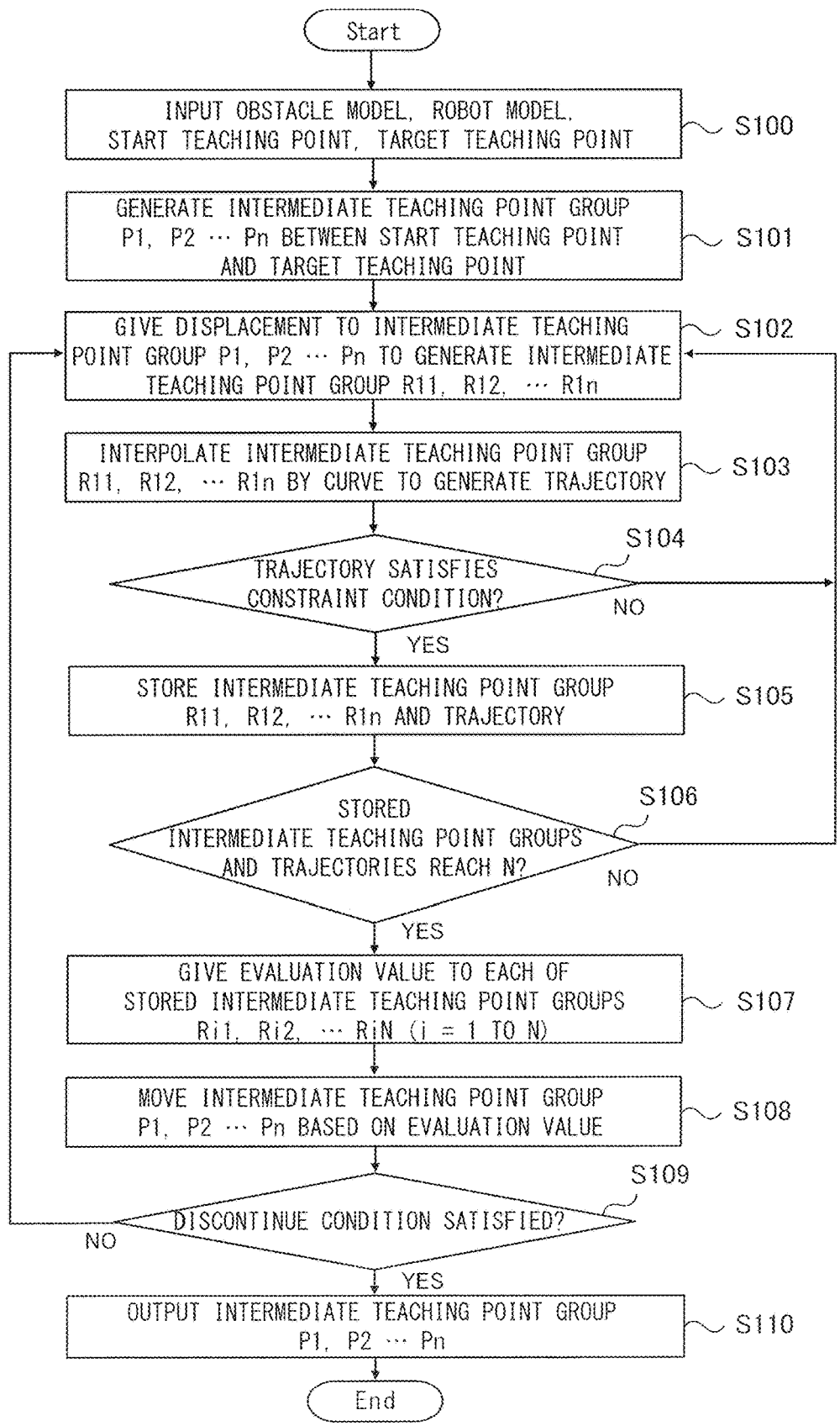
FIG. 4 is a flowchart illustrating a trajectory optimization process of the first embodiment of the present disclosure.

FIG. 4 is a flowchart describing a main control procedure of a trajectory generating method of the present embodiment. The control procedure in FIG. 4 can be stored in the ROM 1602 or in the external storage unit 1604 as the control program of the CPU 1601. FIGS. 5A through 5E illustrate the control procedure in each step in FIG. 4 in the similar format with FIG. 3. While the generation of the trajectory and its optimization are performed below on the 3-D models of the robot arm A and the obstacle Ob, there is a case where the expression of the '3-D model' is omitted and a description is made as if objects to be controlled are the robot arm A and the obstacle Ob in order to simplify the description.

Figure 5A:
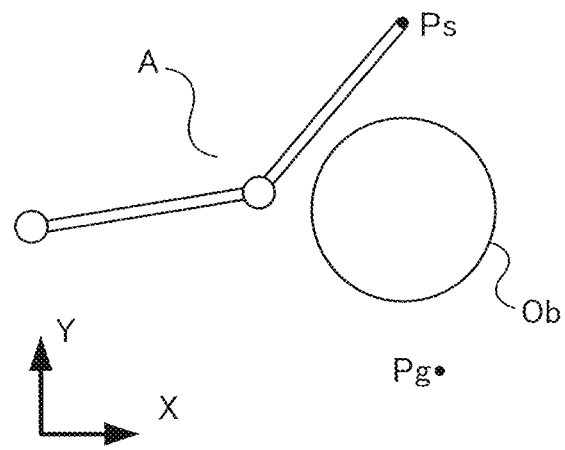
FIG. 5A illustrates an initial step of the trajectory optimization process of the first embodiment of the present disclosure.

The model of the robot arm A, the constraint conditions, the start teaching point Ps and the target teaching point Pg are inputted in a working space in which the robot arm A operates as illustrated in FIG. 5A and described in Step S100 in FIG. 4. A user can input these inputs through the user interface composed of the operation unit 2 and the display unit 4 for example. The user inputs the start teaching point Ps and the target teaching point Pg in particular through a virtual display (GUI) on the display unit 4 or the CPU 1601 may determine the teaching points in generating the trajectory through AI processes.

The model of the robot arm A is design information of components constituting the robot arm A and includes such information as an inertia moment of each link, a mass, a position and an orientation and a number of axes. The constraint conditions are what define physical constraint conditions of the robot arm and include a joint torque constraint, a joint angular speed constraint, a joint angular acceleration constraint, a jerk constraint, a hand speed constraint, a hand acceleration constraint and others.

Figure 5B:
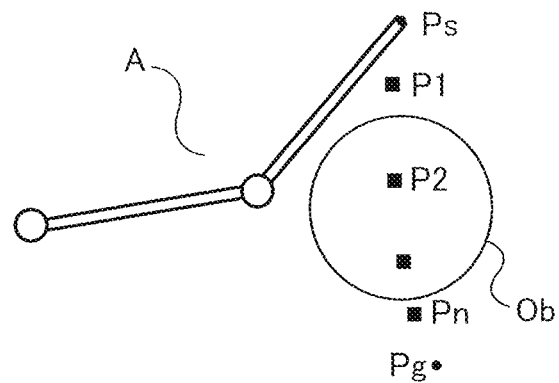
FIG. 5B illustrates a next step of the trajectory optimization process of the first embodiment of the present disclosure.

In Step S101, intermediate teaching points (first intermediate teaching point group) P1, P2 . . . Pn are generated as initial values between the start teaching point Ps and the target teaching point Pg of the robot arm A given in Step S100 as illustrated in FIG. 5B. In the present embodiment, n intermediate teaching points are generated and are arrayed sequentially as P1, P2 . . . Pn as illustrated in FIG. 5B.

It is conceivable to use a path planning algorithm for calculating a path that avoids an obstacle as a method for generating the intermediate teaching points. There are many path generating methods such as a potential method, a PRM (Probabilistic RoadMap Method) and a RRT (Rapidly-exploring Random Tree). Without being limited to the path generating methods described above, other path generating methods such as a visibility graph method, cell decomposition and Voronoi diagram may be also applicable. Without using the path planning algorithm, a process of linearly interpolating the path between the start and target teaching points may be simply used. It is noted that the path planning technology as described above calculates a path that guarantees interference avoidance only in a case where the teaching points are linked linearly to the end. Accordingly, there is a case where interference avoidance is not always guaranteed in a path where the intermediate teaching point group P1, P2 . . . Pn is interpolated by a curve.

For instance, the intermediate teaching point group P1, P2 . . . Pn (first intermediate teaching point group) corresponds to a trajectory that interferes with the obstacle Ob for example as illustrated in FIG. 5B. According to the present embodiment, it is possible to move the intermediate teaching point group (the first intermediate teaching point group) P1, P2 . . . Pn as the initial values so as to generate an optimum trajectory even by starting from such intermediate teaching point group P1, P2 . . . Pn (the first intermediate teaching point group).

It is also possible to set such that the user plots the intermediate teaching point group P1, P2 . . . Pn (first intermediate teaching point group) as the initial values within the virtual environment on the screen through the user interface of the operation unit 2 and the display unit 4.

Figure 5C:
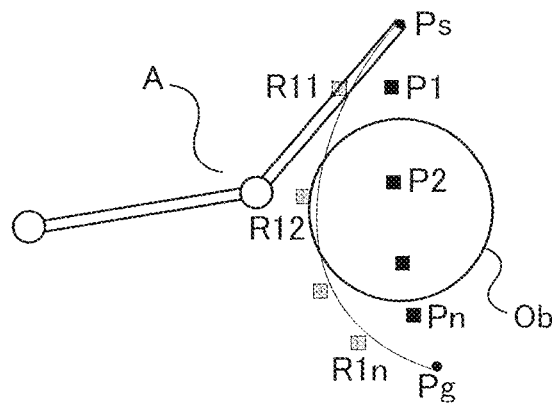
FIG. 5C illustrates a further step of the trajectory optimization process of the first embodiment of the present disclosure.

In Step S102 in FIG. 4, spatial displacement is given to the intermediate teaching point group P1, P2 . . . Pn (first intermediate teaching point group) to generate a new intermediate teaching point group R11, R12, . . . R1$n$ (second intermediate teaching point group) as illustrated in FIG. 5C (intermediate teaching point generating process). As a method for giving the displacement, it is conceivable to add random number values as parameters giving the spatial displacement to each of the intermediate teaching points for example. However, if the method of operating the random number values simply at random is adopted, there is a case where the teaching points are oscillatory disposed and the motion of the robot arm is not smoothed. Because an operation time tends to increase in general if the motion of the robot arm becomes oscillatory, it is not desirable to dispose the teaching points oscillatory.

Then, correlations are given between the random numbers operated on the adjacent intermediate teaching points to give the spatial displacement. This arrangement makes it possible to smooth the trajectory (path). For instance, one-axis joint values of the robot arm at the intermediate teaching point group P1, P2 . . . Pn are set as θ11, θ12, . . . θ1$n$ to consider a multivariate normal distribution with variables of these joint values. It becomes possible to correlate the joint values of the adjacent intermediate teaching points and to generate smooth random values along the path by giving a positive value to a covariance in a variance-covariance matrix.

In Step S103, a trajectory is generated by the interpolation of the paths between the intermediate teaching point group R11, R12, . . . R1$n$ by a curve and by the minimum time control (trajectory generating process). Here, if it is a purpose to avoid the obstacle standing still, it may be enough to evaluate the interference of the robot arm A on the "path" interpolated by the curve, the 'trajectory' is considered in the present embodiment because a time base needs to be taken into account if the obstacle is considered to be movable.

In Step S104, it is determined if the generated trajectory satisfies the constraint condition, and in a case where the trajectory does not satisfy the constraint condition, the process returns to Step S102. In a case where the trajectory satisfies the constraint condition, the process advances to Step S105. The constraint conditions determined in Step S104 is at least a constraint condition that cannot be constrained by the minimum time control technology used in Step S103. The constraint condition determined in Step S104 is that at least a mechanism of the robot arm A does not deviate out of a movable range on the trajectory generated in Step S103. Other conditions such as the joint torque constraint, the joint angular speed constraint, a joint angular acceleration constraint, the jerk constraint, the hand speed constraint and the hand acceleration constraint are also conceivable as the constraint conditions to be determined in Step S104. In Step S104, it is possible to determine so as to generate the trajectory that satisfies either one of or a plurality of such constraint conditions.

In Step S105, the intermediate teaching point group R11, R12, . . . R1$n$ and the trajectory generated based on the intermediate teaching point group are stored. In order to distinguish from other stored intermediate teaching point groups, the intermediate teaching point group to be stored is denoted as Ri1, Ri2, . . . Rin. Here, i is a stored number of order.

In Step S106, it is determined whether numbers of stored intermediate teaching point groups and trajectories reach a certain constant N. If the number of stored intermediate teaching point groups and trajectories do not reach N in Step S106, the process returns to Step S102. If the number reaches N, the process advances to Step S107.

Figure 5D:
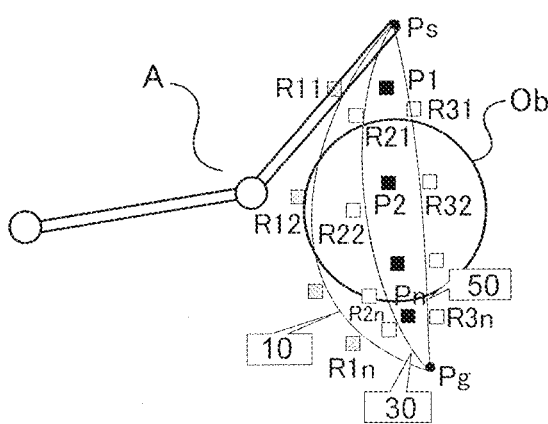
FIG. 5D illustrates a still further step the trajectory optimization process of the first embodiment of the present disclosure.

In Step S107, evaluation values are given to the N stored intermediate teaching point groups Ri1, Ri2, . . . Rin (i=1 to N) as illustrated in FIG. 5D (evaluation process). In the present embodiment, these evaluation values are used to displace (move) the intermediate teaching point group P1, P2 . . . Pn (first intermediate teaching point group) so as to generate the optimum trajectory.

The evaluation values are generated by evaluating a trajectory corresponding to the intermediate teaching point group Ri1, Ri2, . . . Rin (i=1 to N). For instance, a magnitude of interference of the robot arm and the obstacle is assigned as the evaluation value in order to find the trajectory that avoids the robot arm from interfering with the obstacle Ob in the present embodiment. The magnitude of interference may be an interference time during which the robot arm and the obstacle occupy the same one space, a sink-in amount or an interference distance (or an overlapping volume in a sweep space of the both of the robot arm and the obstacle). The interference time is adopted as the magnitude of interference and is used as the evaluation value in the present embodiment.

An example in FIG. 5D indicates evaluation values generated by the magnitude of interference (interference time or sink-in amount) with respect to the three intermediate teaching point groups. The evaluation values are 10 for the second intermediate teaching point group R11, R12, . . . R1$n$, 30 for an intermediate teaching point group R21, R22, . . . R2$n$ and 50 for a group R31, R32, . . . R3$n$. The intermediate teaching point group R11, R12, . . . R1$n$ having less magnitude of interference (close to zero) is evaluated to be best here.

Note that another method may be adopted for the evaluation of the trajectory corresponding to the intermediate teaching point group Ri1, Ri2, . . . Rin (i=1 to N) for a purpose of other than the avoidance of the interference with the obstacle Ob.

Figure 5E:
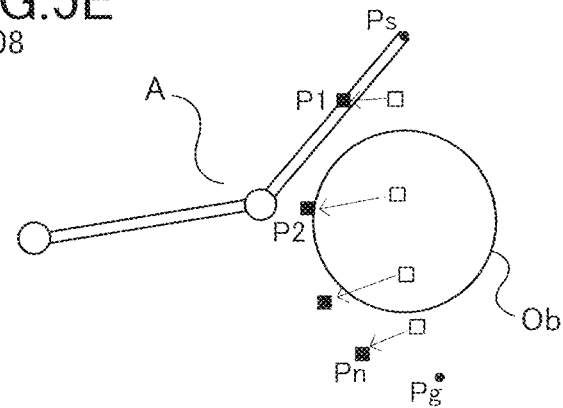
FIG. 5E illustrates a still next step of the trajectory optimization process of the first embodiment of the present disclosure.

In Step S108, the intermediate teaching point group P1, P2 . . . Pn are moved based on the evaluation values of the N intermediate teaching point group Ri1, Ri2, . . . Rin (i=1 to N) as illustrated in FIG. 5E. As one method for moving the teaching point group, it is conceivable to move the intermediate teaching point group P1, P2 . . . Pn to the intermediate teaching point having a lowest (best) evaluation value among the intermediate teaching point groups Ri1, Ri2, . . . Rin (i=1 to N) for example. In the example illustrated in FIG. 5E, the intermediate teaching point group P1, P2 . . . Pn (among the first intermediate teaching point groups) is moved to the position of the intermediate teaching point group R11, R12 . . . R1n having less (close to zero) magnitude of interference.

It is also possible to move the intermediate teaching point group P1, P2, . . . Pn by taking a weighted means of the N intermediate teaching point groups Ri1, Ri2, . . . Rin (i=1 to N) by setting an inverse number of the evaluation value of the intermediate teaching point groups Ri1, Ri2, . . . Rin (i=1 to N) as a weight.

In Step S109, it is determined whether a condition for discontinuing the processes of Step S102 through Step S108 is satisfied. If the discontinue condition is not satisfied, the process returns to Step S102. If the condition is satisfied, the process advances to Step S110.

Or, an upper limit number of times of executing a loop of Steps S102 through S109 may be set in advance. In such a case, in a case where a number of times reach the upper limit number of times in Step S109, the process advances to Step S110 by giving up its trial more than that. Or, such an error processing of outputting an appropriate error message on the display unit 4 may be executed.

The disconnect condition determined in Step S109 is determined under such condition that an evaluation value similar to that in Step S107 is generated with respect to the intermediate teaching point group P1, P2 . . . Pn (first intermediate teaching point group) after the move for example and that the evaluation value satisfies the predetermined conditions. For instance, the present embodiment aims at avoiding the interference of the robot arm A with the obstacle Ob. Then, the condition is set such that the evaluation value generated with respect to the intermediate teaching point group P1, P2 . . . Pn (first intermediate teaching point group) after the move is zeroed, i.e., the magnitude of interference such as interference time or sink-in amount is zeroed. This arrangement makes it possible to generate the optimum trajectory satisfying the constraint conditions related to the motion of the robot (trajectory determining process).

In Step S110, the intermediate teaching point group P1, P2 . . . Pn is outputted as the optimized teaching point group. This output is made by operating the 3-D model (robot arm model) of the robot arm A along the trajectory generated by the optimized intermediate teaching point group P1, P2 . . . Pn within the virtual display of the display unit 4 for example. Or, Step S110 may be a process of outputting the intermediate teaching point group P1, P2 . . . Pn or the trajectory data generated by these teaching points to the robot arm A of the actual machine or to the robot controller (200) hereof in FIG. 10.

Figure 6:
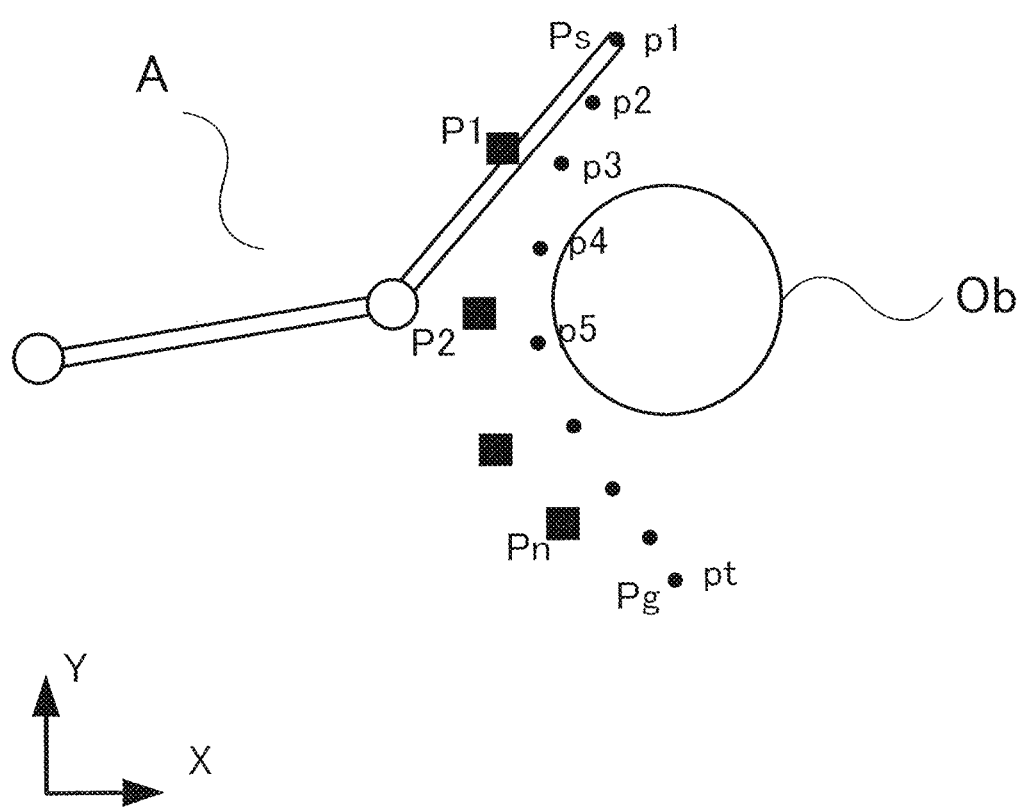
FIG. 6 illustrates a teaching point group and a trajectory of the first embodiment of the present disclosure.

Because the present embodiment aims at avoiding the interference, in a case where the process reaches Step S110, the robot arm is put into a condition in which the robot arm does not interfere with the obstacle along the trajectory (p1, p2, . . . pt) generated based on the intermediate teaching point group P1, P2 . . . Pn after the move as illustrated in FIG. 6.

According to the present embodiment, the plurality of intermediate teaching point groups Ri1, Ri2, . . . Rin (i=1 to N) are generated and based on an evaluation result of the trajectories defined by them, the intermediate teaching point group P1, P2 . . . Pn are moved. The condition related to the physical constraint condition such as the joint torque constraint is used for the evaluation of the trajectory, and the condition of achieving the avoidance of the obstacle is used for an escape condition of the process of moving the intermediate teaching point group P1, P2, . . . Pn. According to the present embodiment, such arrangement makes it possible to generate a smooth curved trajectory avoiding the obstacle and satisfying the physical constraint condition such as the joint torque constraint.

Second Embodiment

An exemplary optimization processing of generating a trajectory along which (the 3-D model of) the robot arm A can move in a minimum time while achieving the avoidance of interference with the obstacle Ob will be described below in a second embodiment with reference to FIGS. 7A through 7E. A configuration of the present embodiment other than those described with reference to FIGS. 7A through 7E, e.g., the hardware configuration of the trajectory generating apparatus and its controller, are the same with those of the first embodiment.

While a control procedure of a trajectory generating method of the present embodiment is the same with the flowchart of the first embodiment illustrated in FIG. 4, the present embodiment is different from the first embodiment in terms of the initial values of the intermediate teaching point group P1, P2 . . . Pn, the constraint conditions on the trajectory, the evaluation method of the trajectory and the discontinue condition. FIGS. 7A through 7E illustrate states of an optimization process of a trajectory (first intermediate teaching point) executed in the present embodiment. FIGS. 7A through 7E illustrate processing of each step in FIG. 4 in terms of the present embodiment by the same format with FIG. 5A through 5E.

In the first embodiment described above, the example of generating the intermediate teaching point group P1, P2 . . . Pn by the path planning technology between the start teaching point Ps and the target teaching point Pg (see FIG. 7A) has been described in Step S101 in FIG. 4. In the present embodiment however, the intermediate teaching point group P1, P2 . . . Pn outputted through the optimization process of the first embodiment is used in Step S101 in FIG. 4 (see FIGS. 6 and 7B).

It is possible to optimize, i.e., to reduce, an operation time of the robot arm A along the trajectory which has been already processed to avoid the obstacle by using the intermediate teaching point group P1, P2 . . . Pn already outputted through the optimization process of the first embodiment as initial values. Thus, the optimization control procedure (see FIG. 4) of the present disclosure can be used in two paths (or plural paths of more than that). In such a case, it is possible to acquire a trajectory optimized for each constraint condition by utilizing a different constraint condition in each path.

In the first embodiment, the new intermediate teaching point group R11, R12, . . . R1n (second intermediate teaching point group) have been generated (see FIG. 5C) and it has been determined whether the robot arm A is within its movable range in determining whether the trajectory of the second intermediate teaching point group satisfies the constraint condition in Step S104 in FIG. 4. In the present embodiment, it is determined whether the robot arm A interferes with the obstacle Ob in addition to generating the new intermediate teaching point group R11, R12, . . . R1n (second intermediate teaching point group) (see FIG. 7C) and to determining whether the robot arm A is within its movable range. In a case where the robot arm A interferes with the obstacle Ob, the intermediate teaching point group R11, R12, . . . R1n is nullified, and the process returns to Step S102.

Still further, the trajectory has been evaluated by the interference time or the sink-in amount as the evaluation value in Step S107 in FIG. 4. In the present embodiment, the trajectory is evaluated by an evaluation value of an operation time of the robot arm A as illustrated in FIG. 7D. This arrangement makes it possible to generate the intermediate teaching point group P1, P2 . . . Pn by which the operation time is minimized. In the case illustrated in FIG. 7D, the evaluation value concerning the operation time of the second intermediate teaching point group is 180 in the intermediate teaching point group R11, R12, . . . R1n, 120 in the intermediate teaching point group R21, R22, . . . R2n and 150 in the intermediate teaching point group R31, R32, . . . R3n. What is evaluated to be best here is the intermediate teaching point group R21, R22, . . . R2n having a less magnitude of interference, i.e., a less value in terms of the operation time.

Still further, one of the discontinue conditions in Step S109 in FIG. 4 is that the evaluation value is zeroed. In the present embodiment however, the method of providing the upper limit number of times on the repetition of the process of Step S102 through Step S109 or a method of providing an upper limit on a number of times during which the evaluation value of the intermediate teaching point group P1, P2 . . . Pn does not (almost) change continuously is used. For instance, the process escapes from the loop of the process of Steps S102 through S109 in a case where the operation time cannot be shortened anymore and outputs the intermediate teaching point group P1, P2 . . . Pn by which the minimum time is acquired in Step S110 as illustrated in FIG. 7E. Or, it is not always necessary to output the intermediate teaching point group P1, P2 . . . Pn in the final move condition as the optimized teaching points in Step S110 in the second embodiment. For instance, it may be arranged so as to take a history record of changes of the intermediate teaching point group P1, P2 . . . Pn in the repetition from Steps S102 through S108 and to output what is evaluated to be best.

As described above, the present embodiment brings about such effect that the trajectory which minimizes the operation time can be generated while avoiding the obstacle and keeping the physical constraint conditions such as the torque constraint. In particular, the optimization control process (FIG. 4) can be used in the two paths (or in plural paths more than that) and in such a case, it is possible to acquire the trajectory optimized for each constraint condition by utilizing the different constraint conditions in each path.

Here, a more specific exemplary configuration of the robot arm A and a configuration in a case where the robot arm A is applied to a manufacturing system will be described.

FIG. 10 illustrates an entire configuration of the robotic arm A more specifically than the configuration in a schematic view of FIG. 2. In FIG. 10, the robot arm A (robotic system) includes a six-axes (joint) vertically articulated robot arm body 201 for example. Each joint of the robot arm body 201 can be controlled to take a desirable position and orientation by servo controlling a servo motor provided in each joint.

A tool such as a hand 202 is attached at a distal end (tip) of the arm body 201. This hand 202 can perform such manufacturing works of grasping a work 203, combining the works 203 and machining the works 203. The work 203 is a component part for example of an article (industrial product) such as an automobile and an electronic product, and the robot arm A can be disposed in such manufacturing system (production line) as a manufacturing unit.

A motion of the arm body 201 of the robot arm A is controlled by a robot controller 200. The motion of the robot arm A can be programmed (taught) by an operation terminal 204, e.g., a teaching pendant or a tablet terminal, connected to the robot controller 200. For instance, it is possible to program a motion of a specific part such as the TCP and a tool attaching face of the robot arm A so as to move along a desirable locus by sequentially designating teaching points through the operation terminal 204.

The robot arm A or the robot controller 200 can receive the intermediate teaching points or the trajectory data optimized as described above from the trajectory generating apparatus (or the robot simulator as illustrated in FIG. 1 through the network NW This arrangement makes it possible to dispose the robot arm A in the manufacturing system (production line) based on the intermediate teaching points or the trajectory data optimized by the process described above and to operate the robot arm A as the manufacturing unit to manufacture articles.

The present disclosure can be realized also by a process by which a program realizing one or more functions of the above-mentioned embodiments is supplied to the system or the apparatus through a network or a storage medium and by which one or more processors in a computer of the system or the apparatus reads and executes the program. It is also possible to realize the present disclosure by a circuit, e.g., ASIC, realizing one or more functions of the above-mentioned embodiment.

Third Embodiment

Next, a third embodiment of the present disclosure will be described. While the obstacle Ob that possibly interferes with the robot arm A is processed as a fixture in the above-mentioned embodiments, a method for generating a trajectory of a robot arm in a case where the obstacle is handled as a movable object will be described in the present embodiment. More specifically, a method for generating trajectories of a plurality of juxtaposed robot arms that enable the robot arms to avoid from interfering with each other and to improve working efficiency will be described. Note that parts different from the above-mentioned first and second embodiments will be described below, and overlapped parts such as the hardware configuration of the robot system will be denoted by the same reference numerals and a description thereof will be omitted. At first, a background the present embodiment will be described.

For instance, Japanese Patent Application Laid-open No. H.11-347984 (referred to as a patent document 1 hereinafter) discloses a controller that operates a plurality of robots efficiently while avoiding the robots from interfering with each other and minimizing a waiting time of each robot. The robot controller disclosed in the patent document 1 prepares an interference table per path between working points of two robots. The use of the interference table makes it clear that a robot arm A interferes with a robot arm B if they are operated in the same time when the robot arms A and B are located respectively at certain working points. In a case where there is a possibility that the robot arms interfere with each other as described above, a work of either one robot arm is prioritized. While data controlling the order of priority is generated as a priority order table, the order of priority is determined in such a case corresponding to a sum or the like of a remaining work time and a waiting time at the working point of each robot.

G S'anchez and J.-C. Latombe, "On delaying collision checking in PRM planning: Application to multi-robot coordination" International Journal of Robotics Research, vol. 21, no. 1, pp. 5-26, 2002 discloses a technique for generating a path by assuming a plurality of robot arms A and B as one robot arm C to avoid the robot arms from interference with each other. FIGS. 16A through 16G illustrate motions of the robot arms A and B controlled by the technique disclosed in the document described above. These robot arms are bi-axis robot arms having two joints (two degrees of freedom). Among the robot arms, the robot arm A is assumed to have bi-axis joint angles of ($\theta$as1, $\theta$as2) at a starting point and bi-axis joint angles of ($\theta$ag1, $\theta$ag2) at a target point. Meanwhile, the robot arm B is assumed to have bi-axis joint angles of ($\theta$bs1, $\theta$bs2) at its starting point and bi-axis joint angles of ($\theta$bg1, $\theta$bg2) at its target point. Still further, the obstacle Ob is disposed in working space of the robot arms A and B.

According to the technique of the document described above, the robot arms A and B are handled as one robot arm C in order to generate paths which take the avoidance of interference among the robot arms and with the obstacle into account. Then, in a four-dimensional configuration space of the robot arm C, the paths avoiding the obstacle from the starting points ($\theta$as1, $\theta$as2, $\theta$bs1, $\theta$bs2) to the target points ($\theta$ag1, $\theta$ag2, $\theta$bg1, $\theta$bg2) are searched. In generating the paths, such path generating algorism as the RRT (Rapidly-exploring Random Tree) and the PRM (Probabilistic Road-Map Method) may be used. It is then possible to determine the respective paths by which the robot arms do not interfere as illustrated in FIGS. 7A through 7G by generating the paths by handling the robot arms A and B (first and second robot arms) as one virtual robot arm.

In the control of the patent document 1 described above, a move of the high-priority robot arm to the working point and its work are conducted first and a move of the low-priority robot arm to the working point and its work are caused to wait until when the move and the work of the high-priority robot arm are finished at their working points where the two robot arm possibly interfere with each other. However, there is a possibility that work efficiency drops if the low-priority robot is caused to wait before the working point until when the high-priority robot finishes its work and moves to a next working point. For instance, there is a possibility that the low-priority robot can start to move even if the high-priority robot is not out of an interference region if a moving time of the low-priority robot entering the interference region is taken into consideration. Still further, in such a case, there is a possibility that the low-priority robot can be moved more quickly by correcting a trajectory of the low-priority robot for example. No such room of optimization is taken into consideration in the technology disclosed in Japanese Patent Application Laid-open No. H.11-347984. That is, while a room for shortening an entire working time is still fully left in the technology disclosed in the patent document 1, this method has a problem that it is unable to deal with that anymore because no trajectories that avoid the two robot arms from interfering with each other while moving in the same time are taken into account.

Meanwhile, according to the method disclosed in the above-mentioned document of G. S'anchez and J.-C. Latombe, the paths are generated by the path generating algorithm by assuming the two robot arms as one robot arm to avoid the two robot arms from interfering with each other while moving in the same time. Such algorithm as the RRT (Rapidly-exploring Random Tree) and the PRM (Probabilistic RoadMap Method) may be used for generating such paths.

The above-mentioned document assumes the first and second robot arms as one virtual robot arm and handles an orientation of the virtual robot arm as one point in the configuration space. Due to that, timings of motions of the first and second robot arms are synchronized. However, if the first and second robot arms are controlled so as to be synchronized and if one robot arm moves only slightly and the other robot arm moves largely for example, there will be a case where the former arm is influenced by the latter arm, thus wastefully delaying the entire operation.

For instance, in the examples illustrated in FIGS. 7A through 7G the robot arm A which moves less may arrive at the target point (FIG. 7G), and it may be preferable for a specific use. However, because the first and second robot arms are handled as the virtual robot arm in the technique of the above-mentioned document, the first and second robot arms cannot but be controlled such that the timings arriving at the target point are equalized. Therefore, in a case where movement varies among the plurality of robot arms, there is a possibility of causing a wasteful constraint on the motion according to the technology disclosed in the above-mentioned document. There is also a possibility of being unable to control the following robot operations by the technique of handling the first and second robot arms as the virtual robot arm as disclosed in the above-mentioned document. Those robot operations are a case where the first and second robot arms approach to a same place and a case where the second robot arm starts to move during when the first robot arm is moving. The control technique of the above-mentioned document is also unable to make the first robot arm arrive first at the target point and start another operation precedingly. That is, the technique of G S'anchez and J.-C. Latombe has such problems that optimization for minimizing the work time of the plurality of robot arms may not be achieved and operations to be generated are limited.

In view of the above-mentioned circumstance, the present embodiment aims at generating an optimum trajectory that enables to operate a plurality of robot arms efficiently without causing interference among the robot arms or between the obstacle and the robot arm within the working space. FIG. 2 illustrates one exemplary arrangement in which the robot arms A and B are operated within the working space in which the obstacle Ob is disposed. In FIG. 11, teaching points PA1, PA2 and PA3 of the robot arm A and teaching points PB1, PB2 and PB3 of the robot arm B are given. Trajectories passing these teaching points will be generated in the trajectory generating process of the present embodiment. In such a case, the trajectories by which not only the robot arms A and B do not interfere with each other but also neither of the robot arms A and B interferes with the obstacle Ob are generated.

Figure 17:
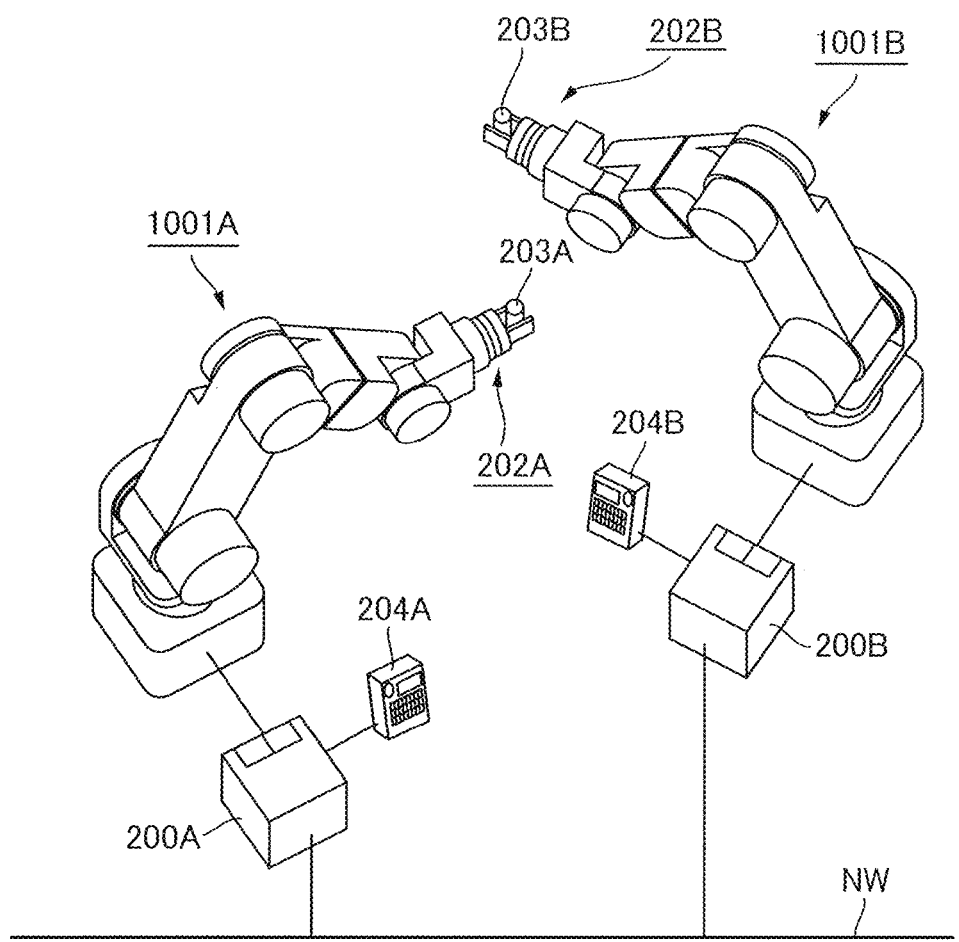
FIG. 17 illustrates robotic systems which can be disposed in a production line according to the embodiment of the present disclosure.

The trajectory generating process of the present embodiment will be described below by assuming that the robot arms A and B are what have two degrees of freedom moving mainly in X and Y directions in a task space. However, the robot arm of the present disclosure may be what is widely recognized as an apparatus that performs automatic works in general, and the present disclosure should not be construed exclusively by a number of joints of the robot arm, a number of degrees of freedom of an orientation realized by the joints and others. For instance, the present disclosure can be carried out by a robotic system using a six-axes articulated robot and a linear motion type robot arm as illustrated in FIG. 17 for example.

In a case of the articulated robot arm having a number of joints of two or more degrees of freedom of this sort, teaching points of the robot arm can be determined by positions and orientations of a hand or by joint shaft angles. While a case of operating two robot arms will be described in the present embodiment, the present disclosure is not limited to a number of robot arms and can be carried out also in a system in which three or more robot arms are operated as described later in a fifth embodiment for example.

In FIG. 11, suppose that the robot arm A moves through teaching points PA1, PA2 and PA3 in this order while avoiding from interfering with the obstacle Ob and the robot arm B. Suppose also that the robot arm B moves through teaching points PB1, PB2 and PB3 in this order while avoiding from interfering with the obstacle Ob and the robot arm A.

Still further, while the robot arms A and B are located at the positions where they interfere with each other at the teaching points PA2 and PB2, an operation by which the robot arm A arrives at the teaching point PA2 before the robot arm B arrives at the teaching point PB2 will be called as an operational constraint in the present embodiment. An operation by which the robot arm A conveys and places a work at the teaching point PA2 and the robot arm B receives the work at the teaching point PB2 is supposed in this operational constraint.

Figure 12:
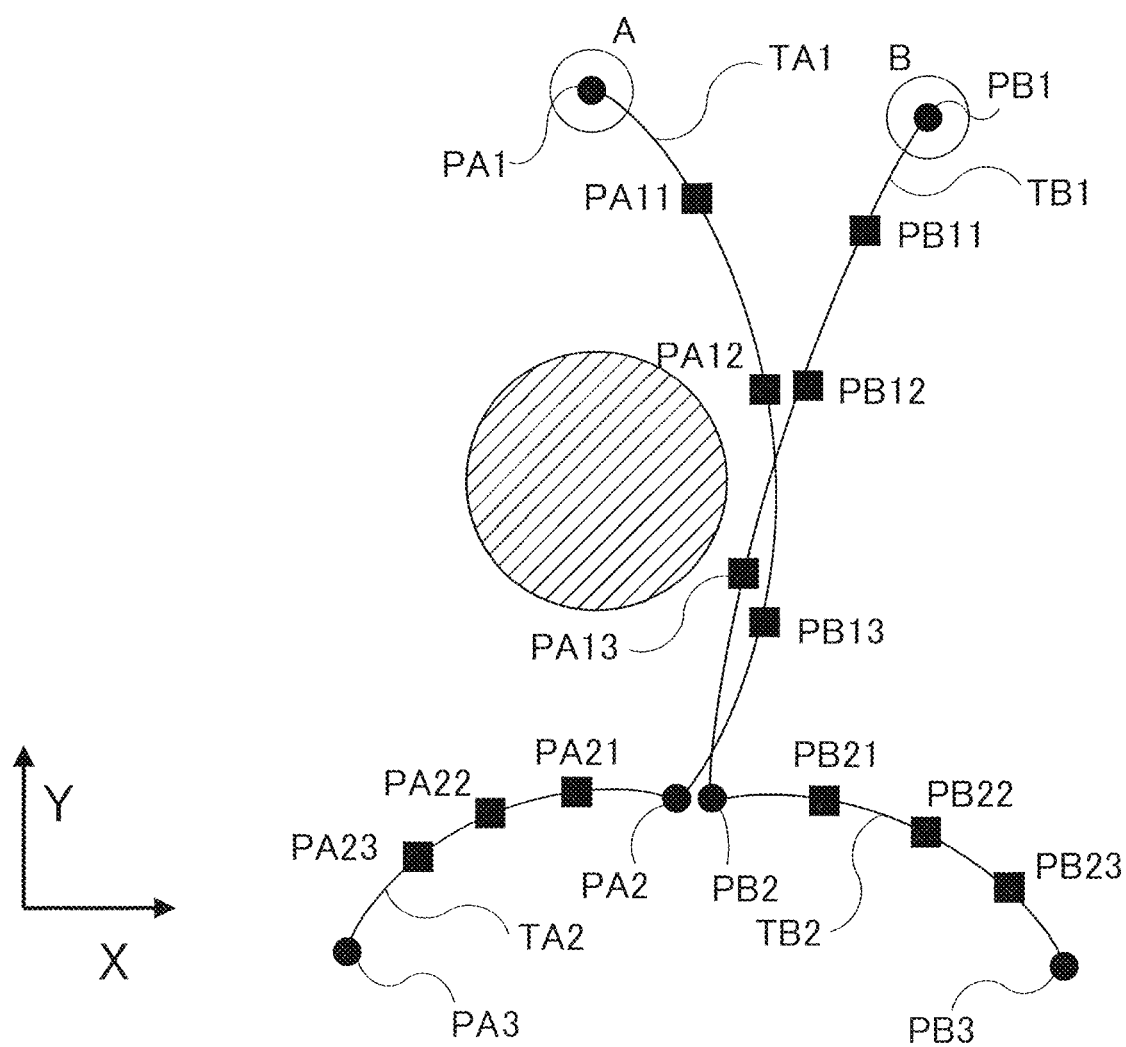
FIG. 12 illustrates teaching point groups and trajectories of the plurality of robot arms of the third embodiment of the present disclosure.

FIG. 12 illustrates intermediate points disposed between the teaching points for evaluation of trajectories and paths of the robot arms in an environment in FIG. 11. It is noted that while a case where three intermediate points are disposed between two teaching points that correspond to starting and target positions will be described in the present embodiment to facilitate the description, the present disclosure is not limited by a number of intermediate points.

In the present specification, the "path" of the robot arm refers to a locus along which a specific reference part such as the robot arm, e.g., a hand, moves while not including time concept such as speed. Still further, the "trajectory" of the robot arm means the "path" and an information body having information of operation speed of the robot arm on the "path" and is clearly distinguished from the above-mentioned "path" in the present specification. The "trajectory" is often expressed by position command value data for positioning a specific reference part of the robot arm per control clock period in general. For instance, the position command value data is expressed in a format such as a list of positional (angular) data of each joint of the robot arm for positioning the specific reference part to a specific position (teaching point).

In the example illustrated in FIG. 12, the robot arm A moves from the teaching point PA1 to the teaching point PA2 by passing on the path TA1 smoothly interpolated by a curve through the teaching point PA1, the intermediate points PA11, PA12, PA13, and the teaching point PA2 as control points. After that, the robot arm A arrives from the teaching point PA2 to a teaching point PA3 by passing on the path TA2 smoothly interpolated by a curve through the teaching point PA2, intermediate points PA21, PA22, PA23 and the teaching point PA3.

Meanwhile, the robot arm B moves from the teaching point PB1 to the teaching point PB2 by passing on the TB1 smoothly interpolated by a curve through the teaching point PB1, the intermediate points PB11, PB12, PB13, and the teaching point PB2 as control points. After that, the robot arm B arrives from the teaching point PB2 to a teaching point PB3 by passing on the TB2 smoothly interpolated by a curve through the teaching point PB2, intermediate points PB21, PB22, PB23 and the teaching point PB3.

As a method for smoothly interpolating the path through which the predetermined part of the robot arm passes between the teaching points (or between the intermediate points) by the curve, there is a known interpolation method such as Spline interpolation, B-Spline interpolation and Bezier curve interpolation. It is possible to realize a smoothly motion of the robot arm A by generating a path smoothly linking those teaching points. It is noted that FIG. 3 illustrates as if the robot arm passes through the intermediate points, the intermediate points are mere parameters for generating the path, and the robot arm is not always required to pass through the intermediate points. For instance, there is a case where the path does not pass through the intermediate points in a case of a trajectory interpolated by the B-Spline interpolation.

There is a minimum time control as a method for generating a trajectory including speed information to the path of the robot arm generated by using the teaching points and the intermediate points. It becomes possible to find a trajectory by which an operation time is minimized within the physical constraint conditions of the robot arm based on the path generated by the interpolation by using the minimum time control in the trajectory generating process described later. Note that the minimum time control is a technology of finding a moving speed by which the operation time is minimized on a predetermined path and does not change the path.

The physical constraint conditions to be satisfied by the motion of the robot arm include the joint torque constraint, the joint angular speed constraint, a joint angular acceleration constraint, the jerk constraint, the hand speed constraint and the hand acceleration constraint for example. The trajectory generated through the use of the minimum time control becomes a position command value of the robot arm per certain control period. However, the trajectory may be generated by utilizing a cam curve without using the minimum time control.

Still further, the robot arm waits for a certain time per each teaching point, and this time will be referred to as a waiting time in the present embodiment (however, the present embodiment does not exclude control by which the waiting time is zeroed). According to the present embodiment, the robot arm A is set to wait for one second of WA at the teaching point PA1 and to wait for two seconds of WA at the teaching point PA2. Because the teaching point PA3 is a final point and the robot arm A continues to wait after the operation, no waiting time is defined for the teaching point PA3. The robot arm B is also set to wait for one second of WB at the teaching point PB1 and to wait for two seconds of WB at the teaching point PB2. Because the teaching point PB3 is a final point, and the robot arm B continues to wait after the operation similarly to the case of the robot arm A, no waiting time is defined for the teaching point PB3.

In FIG. 12, in a case where the robot arms A and B start to move along the paths TA1, TA2, TB1 and TB2, respectively, without waiting, the robot arms A and B are considered to interfere with each other at the teaching points PA2 and PB2 for example.

Here, suppose that it is determined that the robot arm B should arrive at the position of the teaching point PB2 after when the robot arm A arrives at the teaching point PA2 corresponding to working contents or the like. In such a case, it is possible to avoid the robot arms from interfering with each other by setting such that the robot arm B waits by appropriate waiting times (WB1, WB2) at the teaching points PB1 and PB2. Still further, it is necessary to set such that the WB2 is greater (longer) than the WB1 in order for the robot arm A to arrive at the teaching point PA2 before the robot arm B arrives at the teaching point PB2.

Thus, the example in FIG. 12 (or in FIG. 14 described later) generates the trajectories that enable the robot arms A and B to pass through the respective teaching points without causing interference between the robot arms and between the robot arms and the obstacle. The example also generates the trajectories of the robot arms A and B by which the robot arm A arrives at the teaching point PA2 before the robot arm B arrives at the teaching point PB2.

The controller 1000 illustrated in FIG. 9 includes a network interface 1605 serving as a communication unit for communicating through a network NW The arithmetic processor 1 in FIG. 1 can communicate with, i.e., transmit/receive control information such as teaching point data and trajectory data to/from, the robot arms 1001A and 1001B (or their robot controllers 200A and 200B in FIG. 17) of the actual machines through the network interface 1605 and the network NW In such a case, the network interface 1605 is structured with a communication standard of a wired communication of IEEE 802.3 or of a radio communication of IEEEs 802.11 and 802.15. However, an arbitrary communication standard other than those described above may be adopted for the network NW as a matter of course.

A control program of the CPU 1601 for realizing a control procedure described later can be stored in the external storage unit 1604 composed of HDD and SSD and in a storage unit of the ROM 1602 (such as EEPROM area). In such a case, the control program of the CPU 1601 for realizing the control procedure described later can be supplied to the storage unit or can be updated to a new (other) program through the network interface 1605. Or, the control program of the CPU 1601 for realizing the control procedure described later can be supplied to the storage unit described above or can be updated to a new (other) program through a storage device such as various magnet disks, optical disks and flash memories and through their drive units. Accordingly, the various storage devices and storage units in a condition of storing the control program of the CPU 1601 for realizing the control procedure described above constitute a computer readable storage medium storing the control procedure of the present disclosure.

It is noted that in a case of the robot controllers 200A and 200B (in FIG. 17), driver circuits for driving a motor and a solenoid (not illustrated) of each part of the robot arms 1001A and 1001B are connected to the interface 1606 in the system illustrated in FIG. 9. Still further, the user interface including the display 1608 and the operation unit 1609 may be replaced with operation terminals such as teaching pendants 204A and 204B in FIG. 17 in the case of the robot controllers 200A and 200B (FIG. 17).

In a case of generating a trajectory for operating the robot arm between the start and target teaching points in the present embodiment, the motion of the robot arm is evaluated by the trajectory (operational information) generated between the start and target teaching points to calculate an evaluation value of the trajectory (evaluation process). In a trial process or an update process, adequate variations are given to a position within the trajectory and to a waiting time by which the robot arm is caused to wait at that position to change the position and the waiting time and to generate a plurality of new trajectories for example (generating process). The above-mentioned evaluation process is executed on the new trajectories and of selecting one of the new trajectories based on the evacuated values (selection process). More specifically, a trajectory having a higher evaluation value (e.g., the trajectory having the highest evaluation value) is selected in the selection process. Then, the generating process, the evaluation process, and the selection process are repeatably executed in the trial process or the update process.

In the present embodiment, the variations are given to the path of the trajectory, the waiting position and the waiting time at the waiting position to update and to generate a new trajectory in the update process (in Steps S203 through S210 in FIG. 13) as described above. However, the variation may be given only to the path of the trajectory like the first and second embodiments to generate a new trajectory. Or, the variation may be given only to either one of the waiting position and the waiting time described above to generate a new trajectory. Still further, the variation may be given only to one of the path, the waiting position and the waiting time to generate a new trajectory. In addition, giving the variation to the waiting position and/or the waiting time may be also considered to be changing speed for moving the robot arm. That is, it is also possible to generate the new trajectory by changing the speed for moving the robot arm. Note that it is not always necessary to halt the robot arm in changing the speed. Thus, the update process may be arranged so as to update the trajectory by repeating the processes of generating the plurality of new trajectories by changing the trajectory selected in the selection process, of calculating the evaluation value of the motion of the robot arm on each of the changed trajectories and of selecting a trajectory having higher evaluation value.

Figure 13:
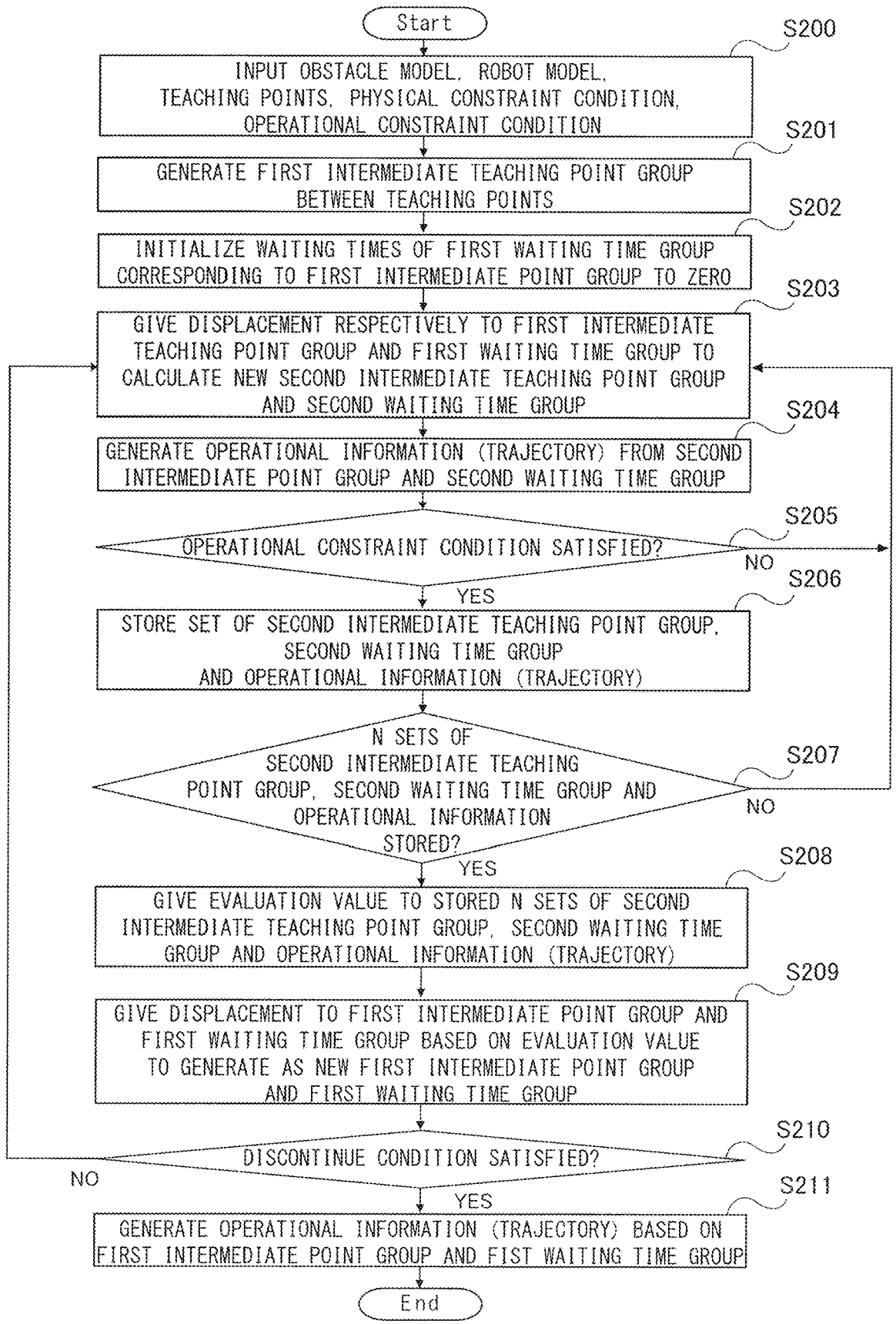
FIG. 13 is a flowchart illustrating a trajectory generating process of the third embodiment of the present disclosure.

FIG. 13 illustrates a flow of the trajectory generating process of the present embodiment. FIGS. 14A through 14D illustrate paths and trajectories of the robot arms corresponding to control of each step in FIG. 13. That is, the trajectory generating process of the robot arms of the present embodiment will be described below with reference to FIGS. 13 and 14.

In Step S200 in FIG. 13, robot arm models simulating these robot arms, physical constraint conditions, operational constraint conditions and respective teaching points are inputted in a working space (FIG. 14A) in which the robot arms A and B operate. The robot arm models corresponding to the robot arms A and B are operated in a virtual space simulating the working space to generate the trajectories and to optimize them. Note that in the following description of the trajectory generating process and of the optimization process, the motions of the robot arm models and the obstacle model in the virtual space may be described as if they are motions of the robot arms and the obstacle of the actual machines in order to simplify the description.

Figure 14A:
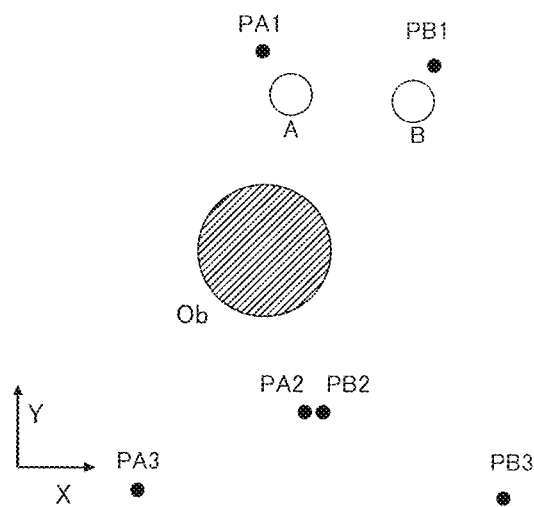
FIG. 14A illustrates a state of a trajectory generating process according to the third embodiment of the present disclosure.

FIG. 14A illustrates the same arrangement and disposition with what illustrated in FIG. 11 such as the robot arm A, the robot arm B, the obstacle Ob, the teaching points PA1, PA2 and PA3 of the robot arm A and the teaching points PB1, PB2 and PB3 of the robot arm B.

The robot arm models of the robot arms A and B are design information of components constituting the robot arms. The robot arm models of the robot arm A and B are expressed by polygonal information, inertia moments, masses, positions and orientations, numbers of axes and others. The physical constraint conditions constituting the robot arm model are what define physical constraint conditions of the robot arm and include a mechanical structure of the robot arm, a joint torque constraint, a hand speed constraint, a hand acceleration constraint and others imposed depending on geometry and the like.

The operational constraint condition is related to a such sequential relation of the motion that the robot arm A arrives at the teaching point PA2 before the robot arm B arrives at the teaching point PB2. The operational constraint condition is determined by a condition or the like of a specific article manufacturing process such that the robot arm A must perform a specific work at the teaching point PA2 before the robot arm B arrives at the teaching point PB2 for example.

In Steps S201 and S202 in FIG. 13, provisional intermediate points (first intermediate point group) are generated and provisional waiting times (first waiting time group) at the respective provisional intermediate points (first intermediate point group) are initialized (initialization process).

In Step S201, the provisional intermediate points (first intermediate point group) are generated between the teaching points given in Step S200. Depending on an evaluation result of a plurality of sets of new intermediate points (second intermediate point group) described later, displacement is applied to the provisional intermediate points (first intermediate point group) to move so as to be able to generate an optimum trajectory.

Figure 14B:
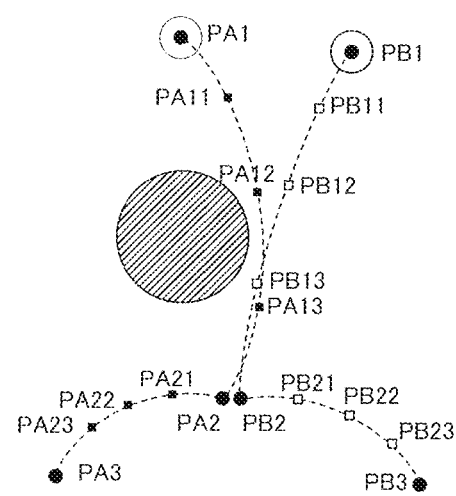
FIG. 14B illustrates another state of a trajectory generating process according to the third embodiment of the present disclosure.

In the present embodiment, three intermediate points are generated between the teaching points as the intermediate points (first and second intermediate point groups). As illustrated in FIG. 14B, provisional intermediate points PA11, PA12 and PA13 (first intermediate point group) are disposed between the teaching points PA1 and the teaching point PA2, and provisional intermediate points PA21, PA22 and PA23 (first intermediate point group) are disposed between the teaching point PA2 and the teaching point PA3. Still further, provisional intermediate points PB11, PB12 and PB13 (first intermediate point group) are disposed between the teaching points PB1 and the teaching point PB2, and provisional intermediate points PB21, PB22 and PB23 (first intermediate point group) are disposed between the teaching point PB2 and the teaching point PB3.

It is conceivable to use the path planning algorithm for calculating the path that avoids the obstacle as a method for generating the provisional intermediate points in Step S201. Such known methods as the potential method, the PRM (Probabilistic RoadMap Method) and the RRT (Rapidly-exploring Random Tree) may be utilized as the path generating method. Still further, without being limited to the path generating methods described above, other path generating methods such as a visibility graph method, a cell decomposition and Voronoi diagram may be also applied. Still further, without using the path planning algorithm, a process of linearly interpolating the path between the start and target teaching points may be simply used.

In the present embodiment, provisional waiting times (first waiting time group) are defined at the provisional intermediate points (first intermediate point group) where the robot arm is caused to wait. Then, the intermediate points (first intermediate point group) are optimized and the corresponding waiting times (first waiting time group) are optimized. In such a case, displacement is given to the provisional waiting times (first waiting time group) to generate new waiting times (second waiting time group) described later. The new waiting times are evaluated together with new intermediate points (second intermediate point group). In Step S202, the provisional waiting times WA1, WA2, WB1 and WB2 (first waiting time group) at each of the provisional intermediate points (first intermediate point group) where the robot arm is caused to wait are initialized to zero.

In Step S203, displacement is applied respectively to the provisional intermediate points PA11 through PA13, PA21 through PA23, PB11 through PB13 and PB21 through PB23 (first intermediate point group) to calculate new intermediate points (second intermediate point group). Displacement is also applied respectively to the provisional waiting times WA1, WA2, WB1 and WB2 (first waiting time group) to calculate new waiting times (second waiting time group).

Here, as a method for giving the displacement, it is conceivable to add a random number value independently to each of the provisional waiting times and the provisional intermediate points. Or, a method of adding the random number value generated by using multivariate normal distribution by linking with parameters of the provisional waiting times and the provisional intermediate points may be used. A range of values of random numbers for displacing the positions or the waiting times within the trajectory can be controlled so as to be narrowed for example as a number of times of repetitive execution of the trial process or the update process repeating the generation and evaluation of new trajectories increases. That is, it is possible to control such that the displacement magnitude applied to each of the intermediate points of the first intermediate point group and to each of the waiting times of the first waiting time group is reduced as the number of times of repetitive execution of the trial process or the update process increases. Such control can be made by setting the range of the values of the random numbers and variance values by a setting process to a random number generating subroutine generating the random numbers for displacing the positions or the waiting times within the trajectory. The control as described above makes it possible to enhance accuracy of the trajectories to be updated and generated and to converge the process favorably.

In Step S204, operational information (trajectory) including time information of the robot arm is prepared by using the new waiting times (second waiting time group) and the new intermediate points (second intermediate point group) (trajectory preparing process). For instance, a path is generated between the teaching points by curve interpolation by using the new intermediate points and the minimum time control per robot arm. After that, position command values per robot arm are generated from the new waiting times and the trajectory per certain control period. The command value during the waiting time is a duplicated position command value by the waiting time for a position at a waiting teaching point. Next, the command values of the robot arms A and B are combined into one command value to generate information body of the operational information indicating the position command values of the robot arms A and B in each time. The information body of operational information is expressed by a structure such as table data on the memory such as the RAM 1603 and the external storage unit 1604 (FIG. 9). This operational information may be considered as control information controlling "the trajectory" including not only the path but also the waiting time. Then, the operational information will be described sometimes in parentheses like the "(trajectory)" hereinafter.

In Step S205, it is determined whether the above-mentioned operational constraint condition is satisfied based on the operational information (trajectory). In a case where the constraint condition is not satisfied, the process returns to Step S203 and where the constraint condition is satisfied, the process advances to Step S206. The "constraint condition" in Step S205 is not a physical constraint condition constrained by the minimum time control technology used in Step S104 but a constraint condition related to the sequential relation of the motions whether the robot arm A arrives at the teaching point PA2 first.

In Step S206, a set of new waiting times (second waiting time group), the new intermediate points (second intermediate point group) and operational information (trajectory) generated based on them is stored (generation process).

Figure 8:
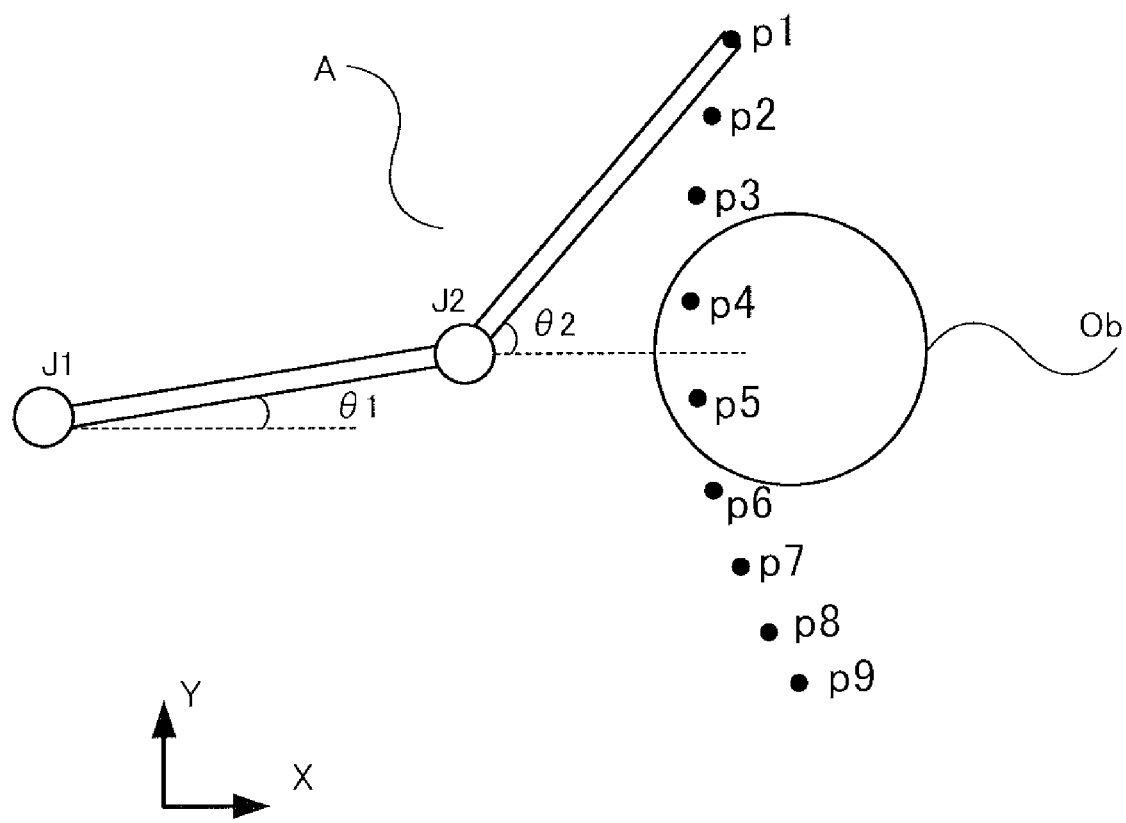
FIG. 8 illustrates a prior art trajectory control method.

In Step S207, it is determined whether a number of stored sets of the new waiting times (second waiting time group), the new intermediate points (second intermediate point group) and the corresponding operational information (trajectory) has reached a predetermined number N. If the number of stored plurality of sets has not reached the number N here, the process returns to Step S203. If the number has reached the number N, the process advances to Step S208. That is, according to the present embodiment, the plurality of, i.e., the predetermined number N of, sets of the new waiting times (second waiting time group), the new intermediate points (second intermediate point group) and the corresponding operational information (trajectory) is generated and stored in the predetermined storage area of the RAM 1603 and the external storage unit 1604 (FIG. 8).

Figure 14C:
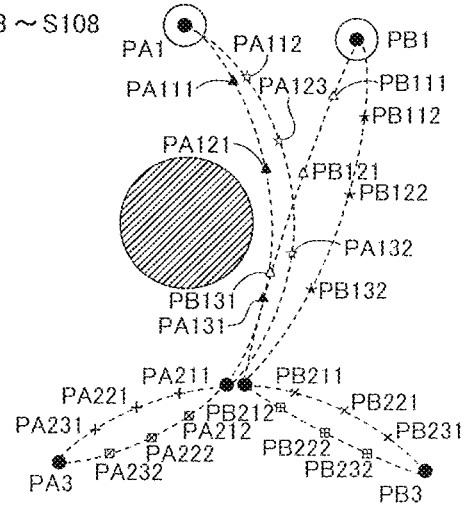
FIG. 14C illustrates a further state of a trajectory generating process according to the third embodiment of the present disclosure.

In the present embodiment, the number of sets of the new waiting times (second waiting time group), the new intermediate points (second intermediate point group) and the corresponding operational information (trajectory) to be generated and stored is set to be N=2 in order to facilitate its description. FIGS. 14B and 14C illustrate exemplary trajectories generated based on the new intermediate points (second intermediate point group) and the corresponding operational information in the case where N=2. In FIGS. 14B and 14C, the new waiting times (second waiting time group) at the teaching points PA1, PA2, PB1 and PB2 of the first set are WA11, WA21, WB11 and WB21, respectively. Still further, new intermediate points (second intermediate point group) between the teaching points PA1 and PA2 acquired by displacing the intermediate points (first intermediate point group) are PA111, PA121 and PA131, and new intermediate points (second intermediate point group) between the teaching points PA2 and PA3 are PA211, PA221 and PA231. Still further, new intermediate points (second intermediate point group) between the teaching points PB1 and PB2 are PB111, PB121 and PB131, and new intermediate points (second intermediate point group) between the teaching points PB2 and PB3 are PB211, PB221 and PB231.

In the same manner, the new waiting times (second waiting time group) at the intermediate point (second waiting time group) at the teaching points PA1, PA2, PB1 and PB2 of the second set are WA12, WA22, WB12 and WB22, respectively. Still further, new intermediate points (second intermediate point group) between the teaching points PA1 and PA2 acquired by displacing the intermediate points (first intermediate point group) are PA112, PA122 and PA132, and new intermediate points (second intermediate point group) between the teaching points PA2 and PA3 are PA212, PA222 and PA232. Still further, new intermediate points (second intermediate point group) between the teaching points PB1 and PB2 are PB112, PB122 and PB132, and new intermediate points (second intermediate point group) between the teaching points PB2 and PB3 are PB212, PB222 and PB232.

In Step S208 in FIG. 13, evaluation values are given respectively to the stored N sets of the new waiting time, the new intermediate point and the operational information (evaluation process). This evaluation is made based on the operational information. The evaluation is made based on a magnitude of interference in order to avoid the robot arm from interfering with another object. The interference between the robot arm and the other object corresponds to the interference between a plurality of robot arm models or between the robot arm model and the obstacle model. In the present embodiment, an interference time during which the robot arm model interferes with the other object (during which the same space is occupied) for example is used as the evaluation value. The determination of the interference is made from polygonal information included in the robot arm. Still further, other than the interference time, a sink-in amount, e.g., an interference distance, between the robot arm and the obstacle (or the other robot arm) may be also used as the evaluation value. However, the evaluation standard of the operational information (trajectory) is not specifically limited to those described above and may be other evaluation standard.

In Step S209, based on the evaluation value of the N sets of the new waiting time, the new intermediate point and the operational information, displacement is applied to and to move the provisional waiting times (first waiting time group) and the provisional intermediate points (first intermediate point group). The following method is used as a method for moving the provisional waiting times (first waiting time group) and the provisional intermediate points (first intermediate point group). For example, the provisional first waiting time group and first intermediate point group are moved to new waiting times and new intermediate points having smallest (best) evaluation values among the set of the new waiting times (second waiting time group), the new intermediate points and the corresponding operational information. Or, it is also possible to use a method of moving the provisional waiting times (first waiting time group) and the provisional intermediate points (first intermediate point group) to a weighted-mean obtained by using the set of the new waiting times (second waiting time group), the new intermediate points and the corresponding operational information as a weight.

Figure 14D:
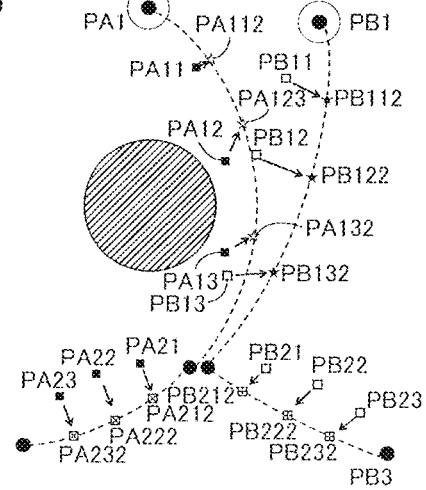
FIG. 14D illustrates a still further state of a trajectory generating process according to the third embodiment of the present disclosure.

FIG. 14D illustrates an example in which the provisional waiting times (first waiting time group) and the provisional intermediate points (first intermediate point group) are moved to the new waiting times (second waiting time group) and the new intermediate points (second intermediate point group) of the second set whose evaluation values have been favorable.

The generation process, the trajectory generating process and the evaluation process composed of Step S203 through Step S209 are repeatedly executed (trial process). An escape condition of the process of this loop (trial process) is determined in Step S210 in FIG. 13.

In Step S210, it is determined whether the condition of discontinuing the process of the loop (trail process) composed of Step S203 through Step S209 is satisfied. If the discontinue condition is not satisfied, the process returns to Step S203. If the discontinue condition is satisfied, the process advances to Step S211 to repeat the process of the loop (trial process).

The present embodiment aims at avoiding the robot arm from interfering with the obstacle. Due to that, the discontinue condition to be determined in Step S210 is set such that a minimum evaluation value is zeroed among the N sets of the new waiting times, the new intermediate points and the operational information.

In Step S211, trajectories by which the robot arms A and B are respectively operated are generated by using the provisional waiting times (first waiting time group) and the provisional intermediate points (first intermediate point group) (trajectory generating process).

As described above, the present embodiment makes it possible to generate the trajectories enabling the plurality of robot arms to avoid from interfering from each other and from interfering with the obstacle while keeping the order of arriving at the teaching points. Still further, the present embodiment enables to add such controls as the operational constraint condition, the physical constraint condition and the minimum time control in generating the trajectory for the evaluation. Accordingly, it is possible to generate the trajectories that operate the plurality of robot arms efficiently while conforming with a work schedule and without causing any mechanical problem.

Fourth Embodiment

The optimization technology of generating the trajectories that enable the plurality of robot arms to avoid from interfering with each other and from interfering with the obstacle without departing from the constraint condition of the order of arriving at the teaching points has been described in the third embodiment. A forth embodiment aims at generating trajectories that enable a plurality of robot arms to operate in a minimum time while avoiding from interfering with each other and from interfering with an obstacle without departing from the constraint condition of the order of arriving at the teaching points.

A hardware structure of a robotic system of the present embodiment is the same with that of the third embodiment, and main steps of a trajectory generating method of the present embodiment conform to those in the flowchart in FIG. 13 of the third embodiment. However, the fourth embodiment is different in terms of the initial value of the provisional waiting time, the initial value of the provisional intermediate point, the operational constraint method, the operation evaluating method and the configuration of the discontinue condition.

In the fourth embodiment, an optimized trajectory is generated by performing the process illustrated in FIG. 13 and by performing a process partially modified from the process in FIG. 13 as described below again by using the provisional waiting times (first waiting time group) and the provisional intermediate points (first intermediate point group) satisfying the discontinue condition.

The process partially modified from the process in FIG. 13 is different in terms of the process in FIG. 13 of the third embodiment that executes the initialization process at first. In the third embodiment, the provisional intermediate points (first intermediate point group) are generated based on the path planning technology in Step S201 in FIG. 13 and the provisional waiting times (first waiting time group) are initialized to zero in Step S202. In Step S202 of the present embodiment however, the initialization is implemented on the provisional waiting times (first waiting time group) and the provisional intermediate points (first intermediate point group) converged and generated in Steps S210 and S211 in FIG. 13. Therefore, Step S211 in FIG. 13 of the third embodiment in the first path of the process is changed so as not to generate the trajectory immediately.

Thus, the provisional waiting times (first waiting time group) and the provisional intermediate points (first intermediate point group) that satisfy the discontinue condition in the process of the third embodiment are used as initial values in the present embodiment. This arrangement makes it possible to execute a trajectory optimization process of reducing an operation time by utilizing the provisional waiting times (first waiting time group) and the provisional intermediate points (first intermediate point group) that have been determined to avoid the robot arms from interfering with each other and from interfering with an obstacle as a starting point.

It has been determined whether the robot arm A arrives at the teaching point PA2 before the robot arm B arrives at the teaching point PB2 in determining whether the trajectory satisfies the constraint condition in Step S205 in the process in FIG. 13 of the third embodiment. In the present embodiment however, it is determined, in addition to the process described above, whether the robot arms interfere with each other or the robot arm interferes with the obstacle. Then, in a case where the robot arms interfere with each other or the robot arm interferes with the obstacle, the new waiting times and the new intermediate points are nullified and the process returns to Step S203 in FIG. 13.

Still further, the operation has been evaluated by using the interference time or the sink-in amount as the evaluation value in Step S208 in FIG. 13 in the third embodiment. In the fourth embodiment however, a required time until finishing all specific motions from teaching points given to a plurality of robot arms, i.e., the robot arms A and B, is used as an evaluation value. It becomes possible to generate the provisional waiting times (first waiting time group) and the provisional intermediate points (first intermediate point group) by which the process working time is minimized by generating such evaluation value.

Still further, in the third embodiment, the discontinue condition in Step S210 in FIG. 13 has been set such that the minimum evaluation value is zeroed among the N sets of the new waiting times, the new intermediate points and the operational information. In the fourth embodiment however, the discontinue condition in Step S210 is set such that whether the number of times of repetition of the process from Step S203 through Step S209 (trial process) reaches a predetermined number of times or such that whether a number of times of the process during which the evaluation value does not change continuously reaches a predetermined number of times. This arrangement makes it possible to deal with a situation in which the trial process is not converged and is diverged and to detect that the provisional waiting times (first waiting time group) and the provisional intermediate points (first intermediate point group) converge substantially in the trial process.

In the fourth embodiment, the provisional waiting times (first waiting time group) and the provisional intermediate points (first intermediate point group) are used to generate trajectories in Step S211. However, history of changes of the provisional waiting times (first waiting time group) and the provisional intermediate points (first intermediate point group) in the repetition of the process in Step S203 through S209 (trial process) may be stored, and the most favorable first waiting time group and the first intermediate point group may be used for the generation of the trajectories. For instance, the provisional waiting times (first waiting time group) and the provisional intermediate points (first intermediate point group) which have obtained the most favorable evaluation value, e.g., a shortest operation time, in the stored history are used for the generation of the trajectories.

As described above, according to the fourth embodiment, the partially modified process of the third embodiment as described in FIG. 13 is executed again by using the provisional waiting times (first waiting time group) and the provisional intermediate points (first intermediate point group) that satisfy the discontinue condition in the process in FIG. 13 of the third embodiment. Such optimization process almost in two-path configuration makes it possible to generate the trajectories that minimize the operation time while satisfying all constraint conditions of the order of arrival to the target teaching points of the plurality of robots and of avoiding the robot arms from interfering with each other and from interfering with the obstacle.

The trajectory generating process of the present embodiment (fourth embodiment) using the plural required times as the evaluation value after the optimization (third embodiment) in which the magnitude of interference in the avoidance of interference is used as the evaluation value has been described above. However, the trajectory generating process of using the required time required until when the plurality of robot arms finish all specific motions from the given teaching points as the evaluation value may be carried out solely in a case where it is not always necessary to consider the avoidance of interference.

Still further, as described in the fourth embodiment, it is possible to generate and optimize the trajectory in the plurality of paths respectively using different evaluation values. That is, in a case of generating and optimizing the trajectory in the plurality of paths respectively using the different evaluation values, the present disclosure is not limited to a number of the paths of the trajectory generating process or its optimization control. For instance, in a case where there is a plurality of evaluation values desirable to be used for the evaluation of the trajectory, a control of acquiring the provisional waiting times (first waiting time group) and the provisional intermediate points (first intermediate point group) that satisfy the discontinue condition one and after can be made by a three or more path configuration for example.

In such a case, a plurality of paths of the trial process executing the initialization process, the generation process, the trajectory generating process and the evaluation process is prepared and mutually different evaluation values are generated in the evaluation process of each path. Then, the mutually different evaluation values are used in the evaluation process of the plurality of paths to use the provisional waiting times (first waiting time group) and the provisional intermediate points (first intermediate point group) that satisfy the discontinue condition in the evaluation process as initial values of waiting times and intermediate points in the initialization process in the succeeding path. Then, a trajectory is generated by using the provisional waiting times (first waiting time group) and the provisional intermediate points (first intermediate point group) that satisfy the discontinue condition of the evaluation process of a final path.

Fifth Embodiment

The trajectory generating process and its optimization control mainly in the two robot arm configuration have been described in the third and fourth embodiments. A configuration in which a robot arm C is disposed, in addition to the robot arms A and B, in the working space will be exemplified in the robotic system of the fifth embodiment. The present embodiment aims at generating trajectories that enable the robot arms to operate via their teaching points without causing interference with each other and with an obstacle as a matter of course. In this case, the constraint condition of that the robot arm A arrives at the teaching point PA2 before the robot arm B arrives at the teaching point PB2 is adopted for the motions of the robot arms A, B and C in the present embodiment.

Figure 15A:
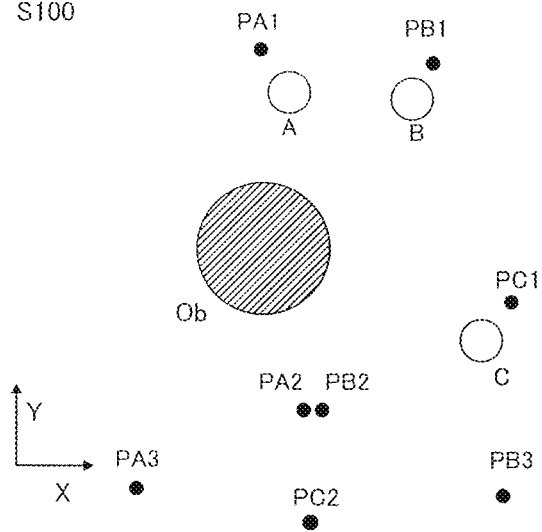
FIG. 15A illustrates an initial step of a state of a trajectory generating process for generating different trajectories according to a fifth embodiment of the present disclosure.

The main steps of the trajectory generating process conform to the flowchart in FIG. 13 also in the fifth embodiment. FIGS. 15A through 15D illustrate controls of the main steps in FIG. 13. In the present embodiment, the robot arm C and teaching points PC1 and PC2 of the robot arm C are newly added to the configuration of the third embodiment as illustrated in FIG. 15A.

Concerning the robot arm C, the teaching points PC1 and PC2 are given and a trajectory along which the robot arm C moves from the teaching point PC1 to the teaching point PC2 is generated. In this case, the trajectory is generated such that the robot arm C can be operated without interfering with an obstacle or with other robot arms as a matter of course. It is also supposed that the robot arm C has no constraint condition of the sequential relation in terms of motions of the robot arms A and B.

It is possible to generate optimum trajectories of the robot arms A, B and C also in such configuration by the same process with that in FIG. 13 of the third embodiment. In such case, a model of the robot arm C, physical constraint conditions, operational constraint conditions, the teaching points PC1 and PC2 are inputted first in addition to the robot arms A and B corresponding to the configuration illustrated in FIG. 15A in Step S200 in FIG. 13. Here, it is supposed that the robot arm C has no operational constraint condition of the sequential relation in terms of motions with other robot arms in the present embodiment as described above.

Figure 15B:
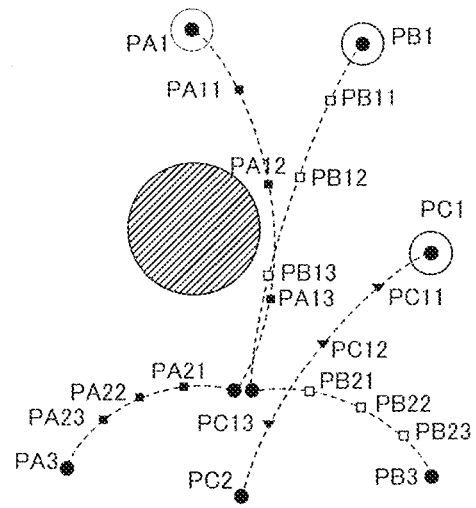
FIG. 15B illustrates a next step of the state of the trajectory generating process for generating the different trajectories according to the fifth embodiment of the present disclosure.

In Step S201 in FIG. 13, initial values of provisional intermediate points PC11, PC12 and PC13 (first intermediate point group) are generated in addition to the process in the third embodiment (FIG. 15B). Still further, in addition to the robot arms A and B of the third embodiment, an initial value of a provisional waiting time WC1 (first waiting time group) is initialized by zero also for the robot arm C in Step 202.

Still further, new waiting times (second waiting time group) and new intermediate points (second intermediate point group) are generated also for the robot arm C similarly to the third embodiment in Step S203 through Step S207 in FIG. 13. At this time, sets of new waiting times and new intermediate points that do not satisfy the operational constraint condition are discarded similarly to the third embodiment, and N sets (N=2) of new waiting times (second waiting time group) and new intermediate points (second intermediate point group) that satisfy the operational constraint condition are calculated.

Figure 15C:
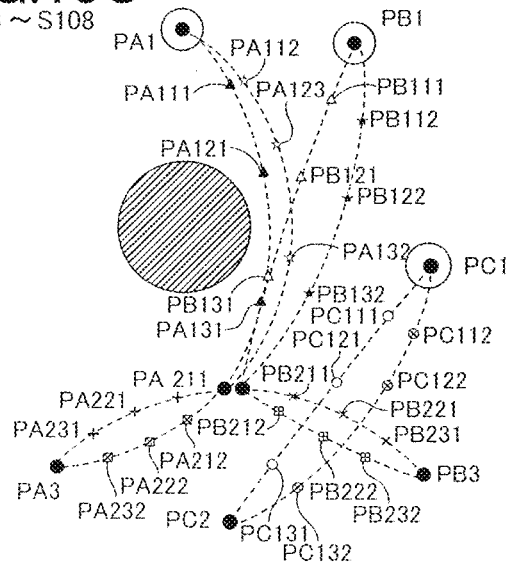
FIG. 15C illustrates a further step of the state of the trajectory generating process for generating the different trajectories according to the fifth embodiment of the present disclosure.
Figure 15D:
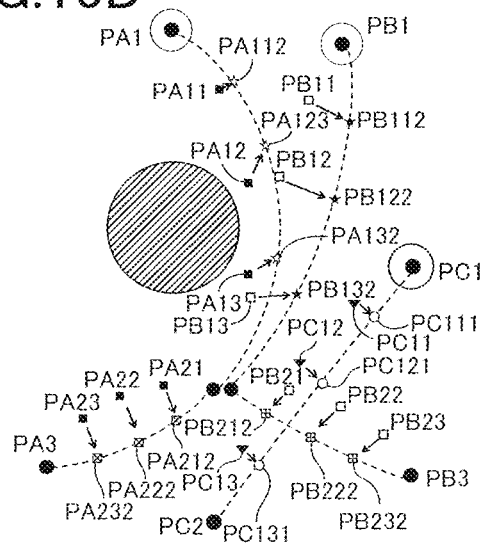
FIG. 15D illustrates a still further step of the state of the trajectory generating process for generating the different trajectories according to the fifth embodiment of the present disclosure.
Figure 16A:
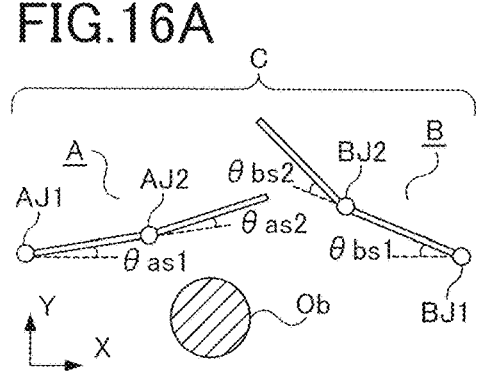
FIG. 16A illustrates a prior art trajectory generating method.
Figure 16E:
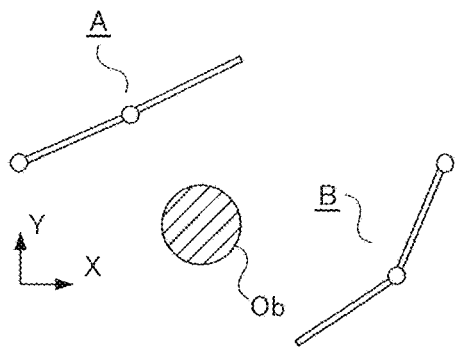
FIG. 16E illustrates the prior art trajectory generating method.
Figure 16B:
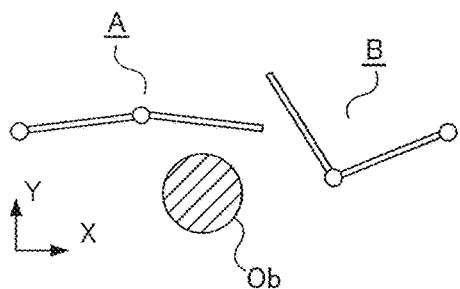
FIG. 16B illustrates the prior art trajectory generating method.
Figure 16F:
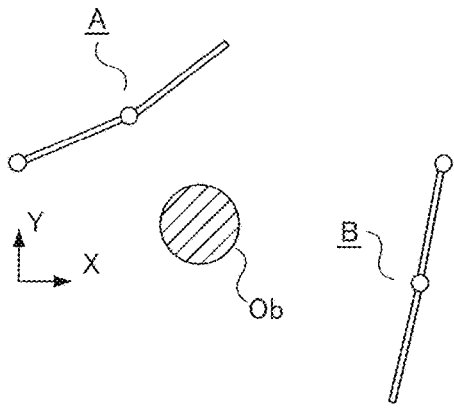
FIG. 16F illustrates the prior art trajectory generating method.
Figure 16C:
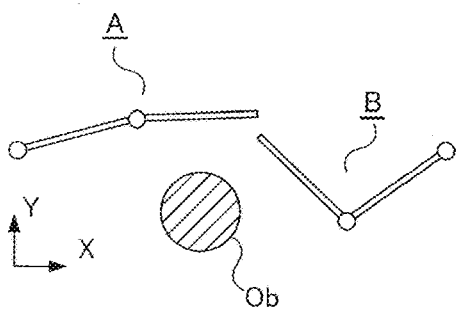
FIG. 16C illustrates the prior art trajectory generating method.
Figure 16G:
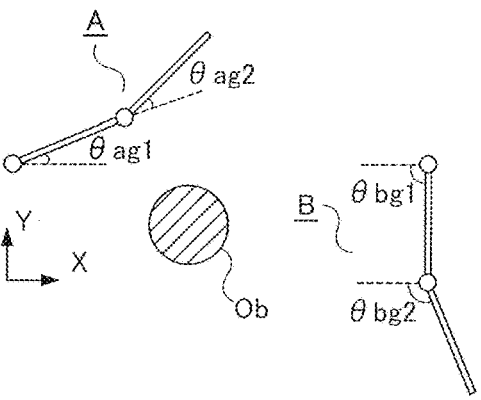
FIG. 16G illustrates the prior art trajectory generating method.
Figure 16D:
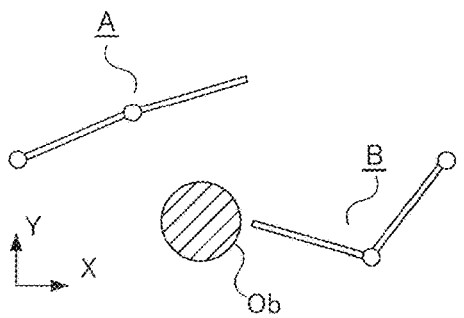
FIG. 16D illustrates the prior art trajectory generating method.

FIG. 15C illustrates an exemplary path corresponding to the new intermediate points (second intermediate point group). Here, the new waiting times (second waiting time group) at the teaching points PC1 and PC2 of the first set are set respectively as WC11 and WC21 in addition to the process in the third embodiment. Still further, PC111, PC121 and PC131 are generated as new intermediate points (second intermediate point group) between the teaching points PC1 and PC2. In the same manner, new waiting times (second waiting time group) at the teaching points PC1 and PC2 of the second set are set respectively as WC12 and WC22. Still further, PC112, PC122 and PC132 are generated as new intermediate points (second intermediate point group) between the teaching points PC1 and PC2.

In Step S208, operational information (trajectories) is generated from the new waiting times (second waiting time group) and the new intermediate points (second intermediate point group) of the robot arms A, B and C to calculate an evaluation value at a time when the robot arms interfere with each other or with the obstacle.

In Step S209, the provisional first waiting time group and the first intermediate point group are moved based on an evaluation result of the evaluation values of the new waiting times (second waiting time group), the new intermediate points (second intermediate point group) and the corresponding operational information (trajectory) of the second set (N=2) similarly to the third embodiment. In the example illustrated in FIG. 15D, the new waiting times (second waiting time group) and the new intermediate points (second intermediate point group) of the second set are adopted, and the provisional waiting times (first waiting time group) and the provisional intermediate points (first intermediate point group) are moved there.

In Step S210 in FIG. 13, it is determined whether the condition of discontinuing the trial process (Step S203 through Step S209) is satisfied is determined in the same manner with the third embodiment. Then, in a case where the discontinue condition is satisfied, the trajectories of the robot arms A, B and C are generated by using the provisional waiting times (first waiting time group) and the provisional intermediate points (first intermediate point group) that satisfy the discontinue condition in Step S211 in the same manner with the third embodiment.

As described above, according to the fifth embodiment, it is possible to generate the trajectories of the three robot arms that enable to operate the robot arms while avoiding from interfering with each other and with the obstacle while keeping the constraint condition of the order of arrival to the teaching point. Still further, such controls as the operational constraint condition, the physical constraint condition and the minimum time control can be added in the trajectory generating process for the evaluation. Accordingly, it is possible to generate the trajectories that enable to operate the plurality of robot arms efficiently while conforming to the working process without causing any mechanical problem.

In the fifth embodiment, the exemplary optimization in generating the trajectories that avoid interference has been described by adding the robot arm C to the third embodiment. However, the control of the fourth embodiment described above can be carried out also in the three-arm configured robotic system. That is, the control of the fourth embodiment is carried out by using the provisional waiting times (first waiting time group) and the provisional intermediate points (first intermediate point group) that satisfy the discontinue condition and acquired in the process (first path) of the fifth embodiment. This arrangement makes it possible to generate an optimum trajectory in terms of an operation time while avoiding interference by using the operation time as the evaluation value. As described above, the trajectory generating process and its optimization control of the present disclosure can generate the trajectory of the robot arm without being limited by a number of robot arms and by evaluation index.

Configuration of Robotic System

Here, a specific exemplary configuration of the robotic system including a plurality of robot arms controlled by the robot trajectory generated by the third through fifth embodiments described above and a configuration in a case where the robotic system is applied to a manufacturing system will be described.

FIG. 17 illustrates exemplary configurations of the robot arms A and B illustrated more specifically than the schematic diagram in FIG. 11. In FIG. 17, robot arms 1001A and 1001B correspond respectively to the robot arms A and B described above and have six-axes (joint) vertically articulated configurations. Each joint of the robot arms 1001A and 1001B can be controlled to desirable position and orientation by servo controlling a servo motor driving each joint.

The robot arms 1001A and 1001B are attached with tools such as hands 202A and 202B at tips thereof. The robot arms 1001A and 1001B can grip works 203A and 203B by the hands 202A and 202B and can perform manufacturing works of assembling and processing these works. The works 203A and 203B are component parts for example of an article (industrial product) such as an automobile, electronic and electric apparatuses. The robot arms 1001A and 1001B can be disposed in a manufacturing system (production line) as manufacturing units.

The operations of the robot arms 1001A and 1001B are controlled respectively by robot controllers 200A and 200B. The operation of the robot arms 1001A and 1001B can be programmed (taught) through an operation terminal 204, e.g., a teaching pendant, connected to the robot controllers 200A and 200B. For instance, it is possible to program an operation of moving specific parts (TCP and a tool attaching face at the tip of the arm) of the robot arms 1001A and 1001B along desirable loci by sequentially designating teaching points through the operation terminal 204.

The robot arms 1001A and 1001B or the robot controllers 200A and 200B can receive optimized intermediate teaching points or trajectory data from the trajectory generating apparatus described above (the robot simulator in FIG. 1) through the network NW Thereby, the robot arms 1001A and 1001B disposed in the manufacturing system (production line) as the manufacturing units can be operated by the optimized intermediate teaching points or the trajectory data and can manufacture articles.

The present disclosure can be realized also by a process of supplying a program that realizes one or more functions of the embodiments described above to a system or an apparatus through a network or a storage medium and of reading and executing the program by one or more processors in a computer of the system or the apparatus. It is also possible to realize by a circuit, e.g., ASIC, that realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-018583, filed Feb. 5, 2018, and Japanese Patent Application No. 2018-178064 filed Sep. 21, 2018, which are hereby incorporated by reference herein in their entirety.

What is claimed is:

1. An information processing method executed by a controller of an information processing apparatus, the method configured to acquire a trajectory to operate a robot having a joint in a space in which an object is disposed between a first position and a second position, the information processing method comprising the controller executing:
    an acquiring process of acquiring a plurality of intermediate trajectories based on a plurality of second intermediate teaching point groups acquired by giving a different displacement to a first intermediate teaching point group disposed between the first position and the second position of the trajectory on which the robot is operated;
    an evaluation process of acquiring an evaluation value concerning an interference between the robot and the object on each of the plurality of intermediate trajectories acquired in the acquiring process;
    an update process of updating the trajectory based on a predetermined intermediate trajectory selected in the plurality of intermediate trajectories based on the evaluation value;
    an outputting process of outputting the trajectory updated in the update process to a control unit controlling the robot to operate the robot actually by using the joint and the trajectory updated in the update process; and
    a displaying process of displaying the updated trajectory on a display unit.

2. The information processing method according to claim 1, wherein the first intermediate teaching point group comprises a plurality of first intermediate teaching points, and
    wherein the plurality of second intermediate teaching point groups each comprises a plurality of second intermediate teaching points.

3. The information processing method according to claim 1, wherein the plurality of second intermediate teaching point groups that allow the robot to avoid the object is generated in the acquiring process.

4. The information processing method according to claim 2, wherein a parameter correlated respectively with the adjacent plurality of second intermediate teaching points is made to act on each of second intermediate teaching point groups to smooth a path connecting the plurality of intermediate teaching points in the acquiring process.

5. The information processing method according to claim 1, wherein the plurality of intermediate trajectories is generated such that an operation time during which the robot is operated is shortened based on the plurality of second intermediate teaching point groups in the acquiring process.

6. The information processing method according to claim 1, wherein the evaluation value is acquired based on a magnitude of interference between the robot and the object and the selected predetermined intermediate trajectory is changed in a direction in which the magnitude of interference is reduced based on the evaluation value to acquire the trajectory in the update process.

7. The information processing method according to claim 6, wherein the magnitude of interference is an interference time during which the robot and the object occupy a same space or is an interference distance between the robot and the object.

8. The information processing method according to claim 1, wherein an operation time in a case where the robot is operated on the plurality of intermediate trajectories to be evaluated is added to the evaluation value.

9. The information processing method according to claim 1, wherein the update process discontinues the update of the trajectory based on a condition in which the calculated evaluation value satisfies a predetermined condition.

10. The information processing method according to claim 1,
    wherein the plurality of intermediate trajectories satisfies a physical constraint condition related to a driving mechanism of the robot between the first position and the second position, and
    wherein the constraint condition comprises one or more conditions between a joint torque constraint, a joint angular speed constraint, a joint angular acceleration constraint, a jerk constraint, a hand speed constraint and a hand acceleration constraint.

11. The information processing method according to claim 1, wherein the update process acquires the trajectory by changing a waiting position where the robot is made to wait and/or a waiting time within the predetermined intermediate trajectory.

12. The information processing method according to claim 11, wherein a magnitude of interference of the robot with another robot operating within a space in which the robot is operated on the new trajectory is acquired as the evaluation value and the waiting position and/or waiting time is changed in a direction in which the magnitude of interference is reduced in the update process.

13. The information processing method according to claim 11, wherein a path through which a predetermined part of the robot passes is acquired by curve interpolation based on the first position, the second position and intermediate points disposed between these positions and speed by which the robot passes through the path is determined by using minimum time control in acquiring the trajectory.

14. The information processing method according to claim 1, wherein the update process discontinues the update of the trajectory based on that a number of times of repetitive execution of the update process reaches a predetermined number of times.

15. The information processing method according to claim 1, wherein the update process discontinues the update of the trajectory in a case that a number of times during which the evaluation value does not change continuously reaches a predetermined number of times.

16. The information processing method according to claim 1, wherein a variation changing the predetermined intermediate trajectory is reduced as a number of times of repetitive execution of the update process increases.

17. The information processing method according to claim 1, wherein the update process updates the trajectory by changing speed for moving the robot.

18. A non-transitory computer readable medium storing a control program rendering a controller execute each process of the information processing method as set forth in claim 1.

19. A manufacturing system, comprising:
    a robot; and
    a controller for manufacturing an article by assembling works by operating the robot on a trajectory generated by using the information processing method as set forth in claim 1.

20. A manufacturing method for manufacturing an article, comprising:
assembling works by operating a robot on a trajectory generated by using the information processing method as set forth in claim 1.

21. The information processing method according to claim 1,
wherein the plurality of intermediate trajectories satisfies a physical constraint condition related to a driving mechanism of the robot between the first position and the second position, and
wherein if the intermediate trajectory on which the robot interferes with the object satisfies the constraint condition, the acquiring process acquires the intermediate trajectory as one intermediate trajectory of the plurality of intermediate trajectories.

22. The information processing method according to claim 1, wherein the plurality of intermediate trajectories satisfies a physical constraint condition related to a driving mechanism of the robot between the first position and the second position, and
wherein the constraint condition comprises a movable range of the robot.

23. The information processing method according to claim 1, wherein the update process judges that the robot does not interfere with the object if the evaluation value is zeroed.

24. The information processing method according to claim 1, wherein the acquiring process acquires the plurality of intermediate trajectories by using one or more methods between a potential method, a probabilistic roadmap method, a rapidly-exploring random tree, a visibility graph method, a cell decomposition, and a Voronoi diagram.

25. The information processing method according to claim 1, wherein the acquiring process acquires the plurality of intermediate trajectories to satisfy a physical constraint condition related to a driving mechanism of the robot, and wherein the evaluation process evaluates the plurality of intermediate trajectories based on the interference between the robot and the object or an operation time in a case where the robot is operated.

26. The information processing method according to claim 1, wherein the displacement is given based on random numbers having correlations between the random numbers.

27. The information processing method according to claim 26, wherein the correlations are given between the random numbers by giving a positive value to a covariance in a variance-covariance matrix.

28. The information processing method according to claim 1, wherein, in the acquiring process, the plurality of intermediate trajectories is smoothed by using at least one method of Spline interpolation, B-Spline interpolation, and Bezier curve interpolation.

29. The information processing method according to claim 1, further comprising a receiving process of receiving an input of the first position and the second position by a user.

30. The information processing method according to claim 1, further comprising a setting process of setting the first intermediate teaching point group based on an operation by a user.

31. An information processing apparatus for acquiring a trajectory to operate a robot having a joint in a space in which an object is disposed between a first position and a second position, the information processing apparatus comprising a controller executing:
an acquiring process of acquiring a plurality of intermediate trajectories based on a plurality of second intermediate teaching point groups acquired by giving a different displacement to a first intermediate teaching point group disposed between the first position and the second position of the trajectory on which the robot is operated;
an evaluation process of acquiring an evaluation value concerning an interference between the robot and the object on each of the plurality of intermediate trajectories acquired in the acquiring process;
an update process of updating the trajectory based on a predetermined intermediate trajectory selected in the plurality of intermediate trajectories based on the evaluation value;
an outputting process of outputting the trajectory updated in the update process to a control unit controlling the robot to operate the robot actually by using the joint and the trajectory updated in the update process; and
a displaying process of displaying the updated trajectory on a display unit.

* * * * *